US008836750B2

(12) United States Patent
Liu et al.

(10) Patent No.: US 8,836,750 B2
(45) Date of Patent: *Sep. 16, 2014

(54) TELEPRESENCE SYSTEM, TELEPRESENCE METHOD, AND VIDEO COLLECTION DEVICE

(71) Applicant: Huawei Device Co., Ltd., Guangdong (CA)

(72) Inventors: Yuan Liu, Shenzhen (CN); Jing Wang, Shenzhen (CN); Guangyao Zhao, Shenzhen (CN)

(73) Assignee: Huawei Device Co., Ltd. (CN)

( * ) Notice: Subject to any disclaimer, the term of this patent is extended or adjusted under 35 U.S.C. 154(b) by 14 days.

This patent is subject to a terminal disclaimer.

(21) Appl. No.: 13/716,508

(22) Filed: Dec. 17, 2012

(65) Prior Publication Data

US 2013/0100240 A1 Apr. 25, 2013

Related U.S. Application Data

(63) Continuation of application No. 12/888,769, filed on Sep. 23, 2010, now Pat. No. 8,692,861, which is a continuation of application No. PCT/CN2009/071745, filed on May 12, 2009.

(51) Int. Cl.
*H04N 7/14* (2006.01)
(52) U.S. Cl.
USPC ........................................ 348/14.01; 709/204
(58) Field of Classification Search
USPC ........................... 348/14.01–14.09, 47–48, 36
See application file for complete search history.

(56) References Cited

U.S. PATENT DOCUMENTS

| 4,928,301 A | 5/1990 | Smoot |
| 5,115,266 A | 5/1992 | Troje |
| 5,495,576 A | 2/1996 | Ritchey |
| 5,745,305 A | 4/1998 | Nalwa |

(Continued)

FOREIGN PATENT DOCUMENTS

| CN | 1917623 A | 2/2007 |
| EP | 2061261 A1 | 5/2009 |

(Continued)

OTHER PUBLICATIONS

Office action issued in corresponding Russian application No. 201113086007(045523),dated Feb. 5, 2013, and an English translation thereof, total 9 pages.
Office action issued in corresponding U.S. Appl. No. 12/888,769,dated Mar. 25, 2013,total 17 pages.

(Continued)

*Primary Examiner* — Maria El-Zoobi
(74) *Attorney, Agent, or Firm* — Huawei Device Co., Ltd.

(57) ABSTRACT

A telepresence system, a telepresence method, and a video collection device are disclosed. The telepresence system includes a video collection device, a video display device, an audio collection device, an audio player, and an audio and video communication device. The audio and video communication device transmits videos collected by the video collection device on a local end and audios collected by the audio collection device on the local end to a remote end through a network; the video display device and the audio player on the remote end play the images and audios respectively; and the video collection device is a panoramic camera. The technical solution under the present invention overcomes the poor effect of panoramic presence in the existing telepresence system, and improves the telepresence system in terms of depth presence, seamless display and eye contact.

15 Claims, 18 Drawing Sheets

(56) References Cited

U.S. PATENT DOCUMENTS

| | | | |
|---|---|---|---|
| 5,793,527 A | 8/1998 | Nalwa | |
| 5,801,758 A * | 9/1998 | Heirich | 348/14.16 |
| 5,990,934 A | 11/1999 | Nalwa | |
| 6,783,247 B2 * | 8/2004 | White | 353/79 |
| 6,795,106 B1 * | 9/2004 | Cooper | 348/14.08 |
| 6,906,860 B2 | 6/2005 | Starkweather | |
| 6,977,676 B1 | 12/2005 | Canon | |
| 7,057,637 B2 | 6/2006 | White | |
| 7,136,090 B1 | 11/2006 | McDuffie White | |
| 7,503,656 B2 * | 3/2009 | Monch | 353/7 |
| 8,035,624 B2 * | 10/2011 | Bell et al. | 345/175 |
| 2002/0075295 A1 | 6/2002 | Stentz et al. | |
| 2002/0122113 A1 * | 9/2002 | Foote | 348/48 |
| 2003/0035001 A1 | 2/2003 | Van Geest et al. | |
| 2003/0067536 A1 | 4/2003 | Boulanger et al. | |
| 2003/0174292 A1 | 9/2003 | White | |
| 2005/0041286 A1 | 2/2005 | White | |
| 2006/0164552 A1 | 7/2006 | Cutler | |
| 2006/0181607 A1 | 8/2006 | McNelley et al. | |
| 2007/0040903 A1 | 2/2007 | Kawaguchi | |
| 2007/0299912 A1 | 12/2007 | Sharma et al. | |
| 2008/0012936 A1 | 1/2008 | White | |
| 2008/0143818 A1 | 6/2008 | Ferren | |
| 2009/0096861 A1 * | 4/2009 | Saleh et al. | 348/14.08 |

FOREIGN PATENT DOCUMENTS

| | | | |
|---|---|---|---|
| GB | 2353429 A | 2/2001 | |
| RU | 2322771 C2 | 4/2008 | |
| WO | 2007123960 A1 | 11/2007 | |

OTHER PUBLICATIONS

Sei Ikeda et al., "High-resolution Panoramic Movie Generation from Video Streams Acquired by an Omnidirectional Multi-camera System",IEEE Conference on Multisensor Fusion and Integration for Intelligent Systems 2003,total 6 pages.

H. Lichtman, "Telepresence,Effective Visual Collaboration and the Future of Global Business at the Speed of Light", Lichtman Human Productivity Lab, Aug. 2006,total 86 pages.

First office action issued in corresponding Chinese patent application No. 200980116849.2, dated Mar. 31, 2012,and English translation thereof, total 11 pages.

Search report issued in corresponding European patent application No. 09842025.0 , dated May 30, 2011, total 6 pages.

Search report & Written Opinion issued in corresponding PCT application No. PCT/CN2009/071745, dated Feb. 11, 2010, total 9 pages.

Lei Zhongfeng et al. "Video Image Stitching and its Application", China cable television, dated 2003, total 8 pages.

Ma Li et al., "A High Resolution Panoram is VideoMon itor ing System Based on Video Mosaicing", Journal of Image and Graphics vol. 13, No. 12, dated Dec. 2008, total 6 pages.

Markus Gross et al., "Blue-C, A Spatially Immersive Display and 3D Video Portal for Telepresence", total 9 pages.

First office action issued in corresponding Russian patent application No. 2011130860, dated Jun. 8, 2012,and English translation thereof, total 6 pages.

First office action issued in corresponding U.S. Appl. No. 12/888,769, dated Sep. 25, 2012, total 32 pages.

Second office action issued in corresponding Russian patent application No. 2011130860 dated Oct. 8, 2012,and English translation thereof, total 7 pages.

1st office action issued in corresponding European patent application No. 09842025.0 , dated Aug. 30, 2013, total 4 pages.

* cited by examiner

TELEPRESENCE SYSTEM, TELEPRESENCE METHOD, AND VIDEO COLLECTION DEVICE

CROSS-REFERENCE TO RELATED APPLICATION

This application is of U.S. Ser. No. 12/888,769, filed on Sep. 23, 2010, which is a continuation of International Application No. PCT/CN2009/071745, filed on May 12, 2009, all of which are hereby incorporated by reference in their entireties.

FIELD OF THE INVENTION

The present invention relates to videoconference technologies, and in particular, to a telepresence system, a telepresence method, and a video collection device.

BACKGROUND

Telepresence is a videoconference system for implementing a virtual conference environment. The virtual conference environment aims to: reflect the personalization factors of the attendees sufficiently, simulate the real experience of the attendees as far as possible, improve the acceptability to the end users immensely, and improve the equipment use ratio, return on investment and user satisfaction. Compared with a traditional videoconference system, an ideal Telepresence system brings more merits: images that simulate the size of a real person; smooth motion; precise gestures; video, lighting, and audio of a studio level; eye contact and communication like eye contact among a large user group; immersive conference environment, which makes the attendees feel as if they are on the same conference site; consistency of difference conference sites; and hidden cameras, which reduce impact on the users.

In the process of implementing the present application, the inventor finds that the existing telepresence system is defective in poor panoramic presence effect. The existing telepresence system generally uses multiple cameras and multiple large-screen monitors for collecting and displaying images. Each camera or monitor collects or displays one or more persons on the local or remote site. In the existing telepresence system, multiple cameras are used for photographing, and disparity exists between the images photographed by different cameras. It is impossible to splice multiple images into panorama by laying out the cameras. It is necessary to use the monitor rim to cover up the defects of the images at the perspective joint of the cameras. Therefore, the existing telepresence system is unable to give pleasant panoramic experience to the attendees. When the attendees are moving in the area near the monitor rim, the image effect is even unacceptable.

Moreover, the existing telepresence need to improve the following aspects:

1. Depth Presence

Most telepresence system still presents two-dimensional (2D) images. That is, the users see planar images only, and are unable to perceive the depth information of the conference scene of the opposite party.

2. Seamless Display

The existing telepresence system generally uses multiple large-sized flat televisions, either Liquid Crystal Display (LCD) or Plasma Display Panel (PDP), to present images in a combined way. In the adjacent display area between two flat televisions, part of the images presented in such a way is obstructed by the television rim, thus making it impossible to give panoramic seamless experience to the attendees.

3. Eye Contact/Gaze Perception

Eye-to-eye contact is an important non-lingual communication mode. Eye contact causes heart beats and blood pressure change physiologically, and improves the activity of the brain. Gaze perception provides many communication foundations such as feedback, dialog mode, and emotion expression, and is a key means of perceiving the thoughts of the opposite party. The traditional videoconference system and the existing telepresence system are unable to enable eye contact between users due to disparity: Instinctively, the user looks at the opposite party on the screen rather than the camera, but the camera is usually not located at the center of the screen. Consequently, disparity exists between the picture photographed by the camera and the picture faced by the user, and good eye contact is impossible.

SUMMARY OF THE INVENTION

The embodiments of the present invention provide an improved telepresence system, telepresence method, and video collection device to present a good panoramic effect, and improve the depth presence, seamless display, and eye contact in the telepresence system.

The technical solution under the present invention includes the following:

A telepresence system includes: a video collection device, configured to collect images on a local end; an audio collection device, configured to collect audios on the local end; a video display device, configured to display images from a remote end; an audio player, configured to play audios from the remote end; an audio and video communication device, configured to transmits the images collected by the video collection device on the local end and audios collected by the audio collection device on the local end to the remote end through a network, the images and the audios are displayed and played respectively by a video display device and an audio player on the remote end;

wherein the video collection device is a panoramic camera, and the system further comprises an image mosaics unit, configured to splice low-resolution images photographed by the panoramic camera from different perspectives into a high-resolution panoramic image.

A telepresence method includes:

obtaining local panoramic images and audios, photographing images through a panoramic camera from different perspectives, and splicing low-resolution images photographed by the panoramic camera from different perspectives into a high-resolution panoramic image through an image mosaics unit; and transmitting local panoramic images and audios to a remote end through a network for displaying and playing.

A video collection device in a telepresence system is provided. The telepresence system further includes a video display device, an audio collection device, an audio player, and an audio and video communication device. The audio and video communication device transmits the images collected by the video collection device and the audios collected by the audio collection device to the remote end through a network, and the video display device and the audio player on the remote end display and play the images and audios. The video collection device is a panoramic camera. An image mosaics unit splices the low-resolution images photographed by the panoramic camera from different perspectives into a high-resolution panoramic image.

It can be seen from the above description that, the embodiments of the present invention are upgrade from the existing telepresence system. The ordinary camera can be replaced with a panoramic camera to photograph the panorama of the local conference room and provide a conference panorama for the opposite attendees. In this way, the telepresence system gives a good panoramic presence effect, and is compatible with the existing telepresence system.

Preferably, an ordinary projection screen or holographic transparent projection screen is employed to present the images seamlessly in an integrated way, thus implementing seamless presence and overcoming the defect brought by combination of multiple flat televisions.

Preferably, a holographic transparent projection screen and a semi-reflective semi-transparent mirror are employed to provide depth presence for the attendees.

Preferably, through control of a synchronizing unit, the panoramic camera is free from impact caused by the image projection of the projector when photographing the local images, thus avoiding disparity caused by inability of placing the camera in the line of sight of the user and enabling the opposite attendee to enjoy the eye contact. Besides, the semi-reflective semi-transparent mirror or an optical conduction component or a linear polarizer may be used to enable eye contact.

Preferably, a special dark background is deployed, a background projector or background monitor is used, and a dark background is deployed behind the user. In this way, the user image is separated from the background image, and the effect of depth presence is generated.

DETAILED DESCRIPTION

In order to make the technical solution, objectives, and merits of the present invention clearer, the following describes the embodiments of the present invention in more detail with reference to accompanying drawings and exemplary embodiments.

First, the first embodiment of the present invention is described below.

Figure 1:
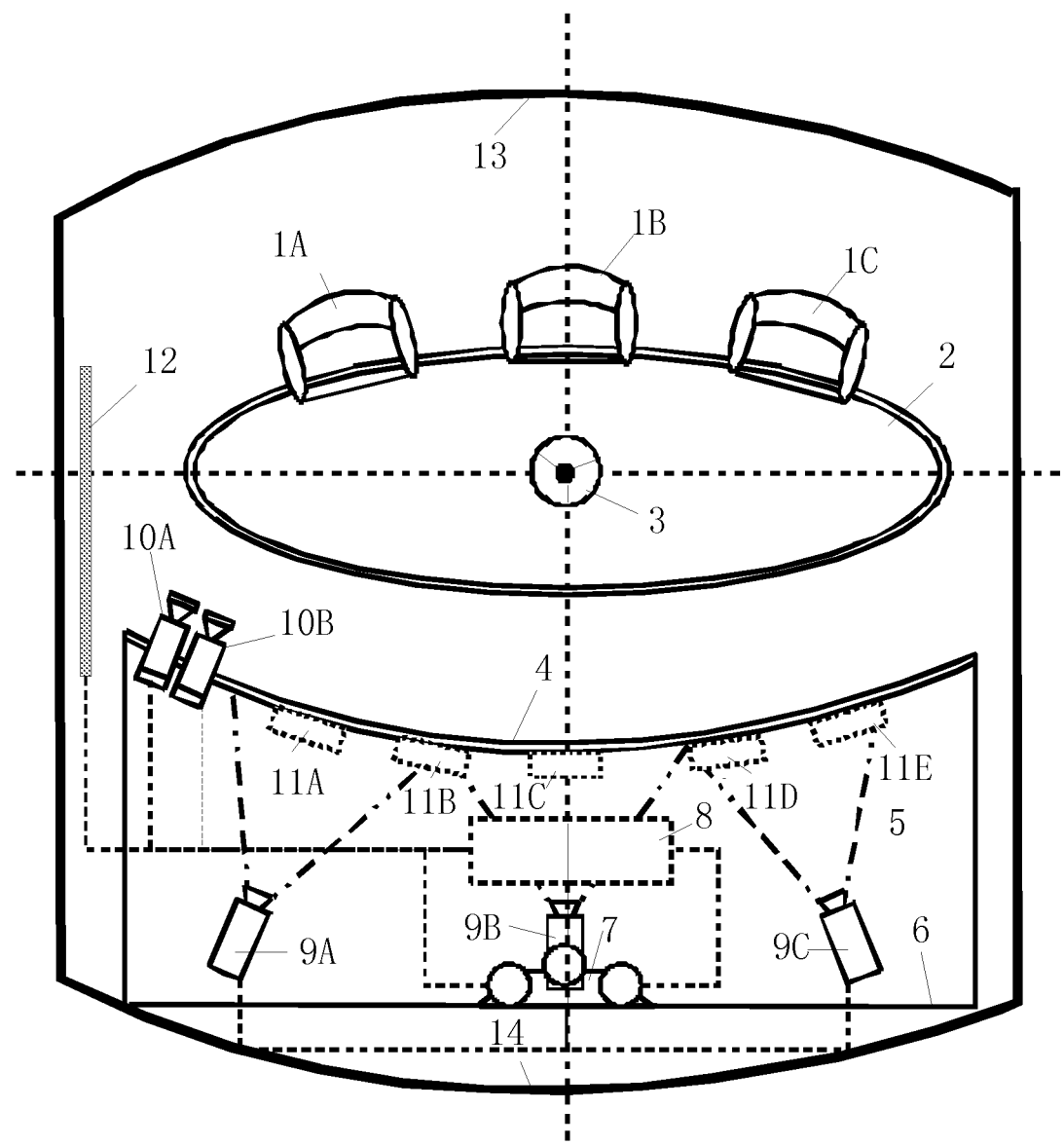
FIG. 1 is the first planform of a conference room layout in a telepresence system in a first embodiment of the present invention.
Figure 4:
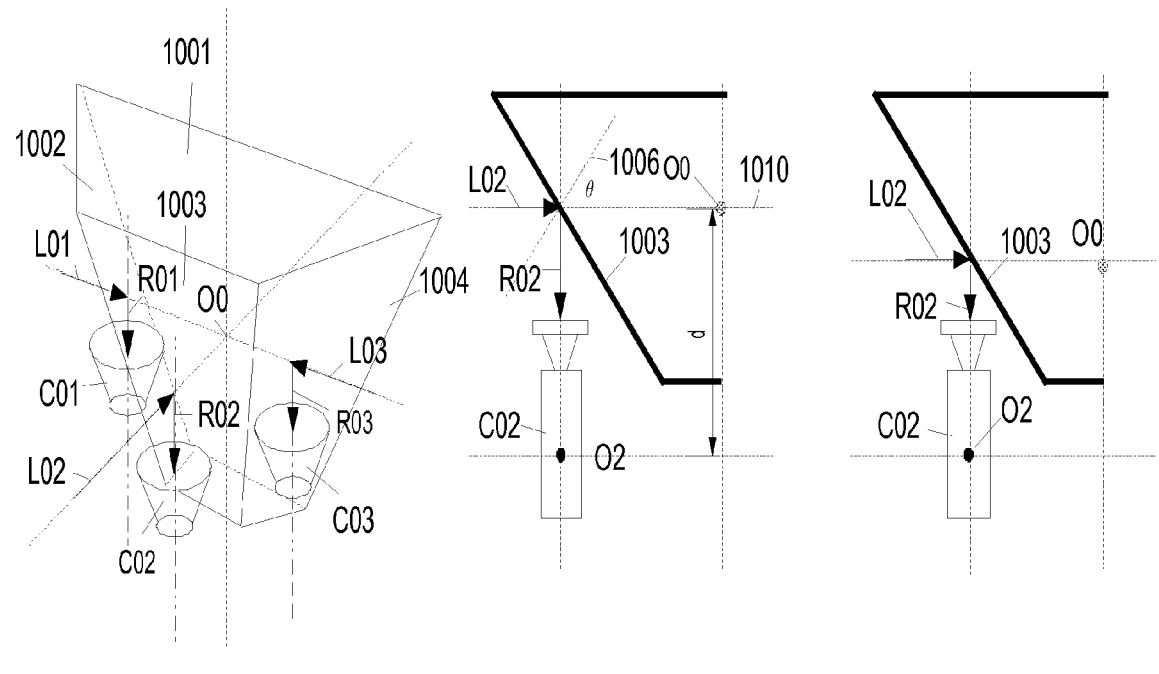
FIG. 4 is schematic diagram of a panoramic camera in a telepresence system in a first embodiment of the present invention.
Figure 4:
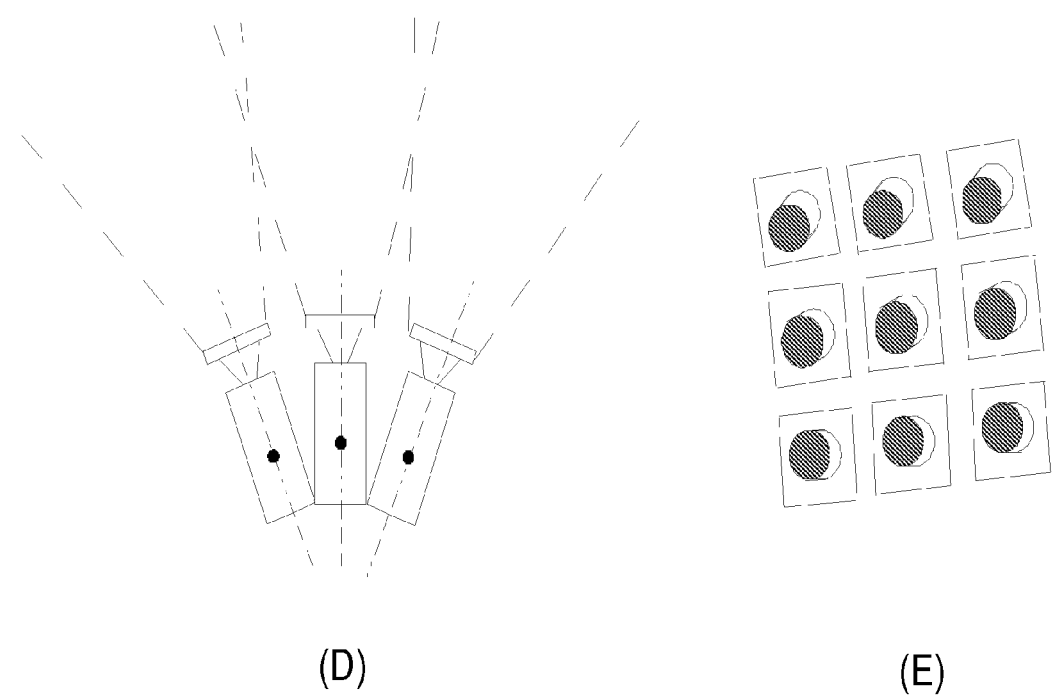

FIG. 1 is the first planform of a conference room layout in a telepresence system in the first embodiment of the present invention. In FIG. 1, the front wall 13 and the rear wall 14 of the site are an arc or plane, and a conference table 2 is set in the middle. A microphone array 3 is installed on the conference table 2. In order to collect the conference audio data more effectively, the microphone array 3 may be placed in the middle of the conference table 2. Multiple attendee seats 1A, 1B, and 1C are placed on one side of the conference table 2. The attendee seats face a projection screen 4. The projection screen 4 is an arc or plane shape (in the Figure, the projection screen is an arc shape), and makes up a front surface of camera bellows (dark enclosure) 5. The camera bellows 5 holds a panoramic camera 7 (here the panoramic camera includes three cameras, as shown in FIG. 4), an audio communication device 8, multiple projectors 9A, 9B, and 9C, and multiple speakers. For example, five speakers 11A, 11B, 11C, 11D, and 11E make up a speaker array in the Figure. The inner wall 6 of the camera bellows 5 opposite to the projection screen 4 is a backdrop decorated specially. The special decoration refers to decoration that produces a depth prompt effect and can hide cameras. The back of the attendee seat is a dark backdrop 13 decorated specially. An auxiliary monitor 12 is placed on one side of the conference room. One or more object cameras 10A and 10B are placed above the camera bellows 5 to make up one or more stereoscopic camera pairs. One stereoscopic camera pair is made up of two ordinary object cameras, which simulate the visual principles of a human and photograph the scene from the left and right perspectives simultaneously to obtain a left image and a right image.

Figure 2:
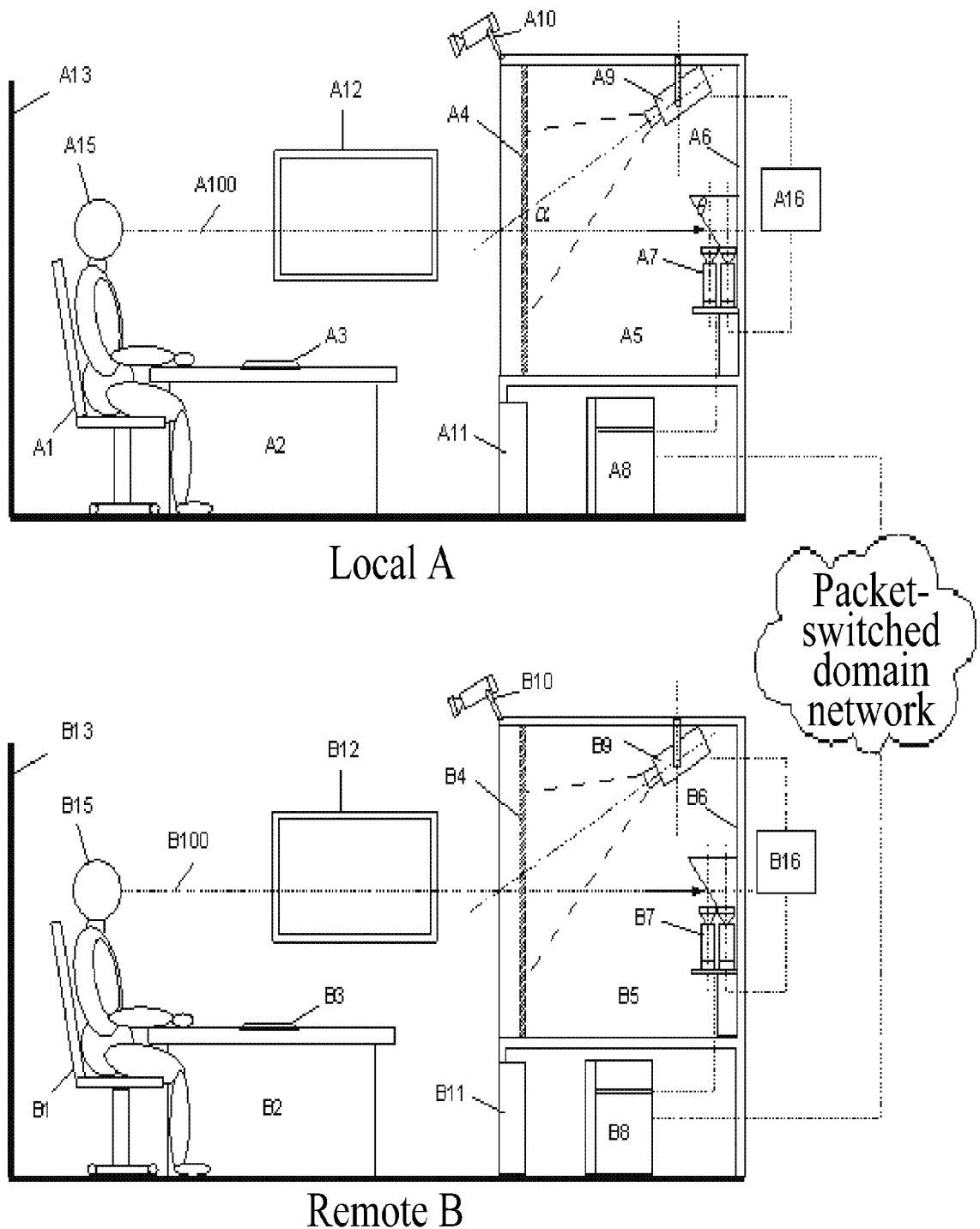
FIG. 2 is the first schematic diagram of a telepresence system in a first embodiment of the present invention.

FIG. 2 is the first schematic diagram of the first embodiment of the present invention. FIG. 2 shows that the local telepresence site and the remote telepresence site have the same configuration, and are interconnected through a network.

Figure 3:
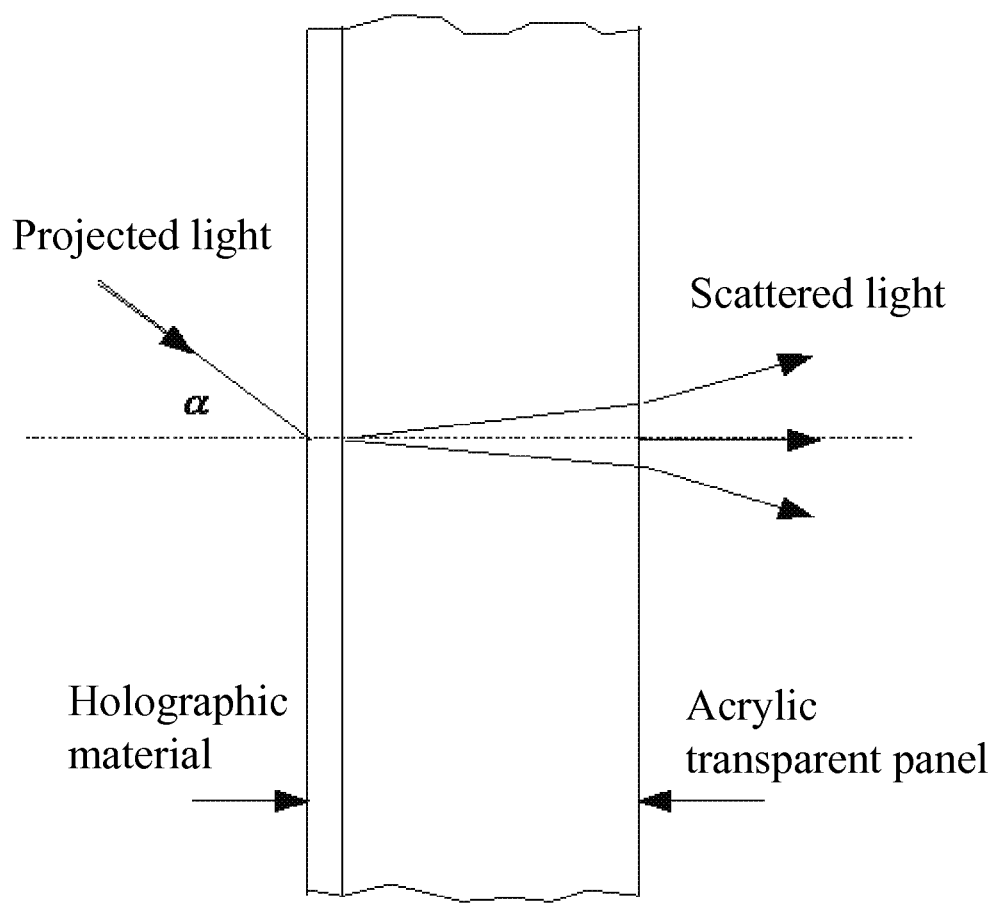
FIG. 3 is a holographic projection diagram of a telepresence system in a first embodiment of the present invention.

Preferably, in the first embodiment, the local projection screen $A_4$ and the remote projection screen $B4$ are holographic transparent projection screens. The holographic transparent projection screens are rear projection screens based on a hologram technology, and are characterized by holographic images. They display only the images from a specific perspective of the rear projection, but ignore the light rays from other perspectives. The holographic screens generate very bright and clear display effects, even if the environment light rays are very bright, and are transparent so that the audience can see the objects behind the screen. Currently, some manufacturers like Woehburk, HoloPro, and Sax3D manufacture the holographic transparent projection screens. FIG. 3 displays the basic principles of the holographic projection. As shown in FIG. 3, the projection rays that take on a α angle are scattered by the holographic transparent projection screen composed of holographic materials and transparent panels. In this way, the user can see the projection content but cannot see the objects behind the projection content area. However, the horizontal rays emitted by the object behind the projection screen except the projection content are transmitted by the projection screen. Through such projection screen area, the user can see the object behind the projection screen.

In the first embodiment, an installation angle α exists between the projection angle of the projector A9 in the camera bellows A5 and the horizontal line. The projector A9 projects the image of the remote attendee B15 to the local holographic transparent screen A4. Because the panorama of the remote scene B is presented, the resolution of one projector may be not enough. The audio and video communication device A8 splits the remote image into several parts, which are presented by multiple projectors A9 (because the schematic diagram in FIG. 2 is a right view, the multiple projectors are overlapped and are not all presented). In order to hide the projectors, the color of the projectors A9 is preferably the same as the color of the camera bellows background A6 behind.

In order to collect the panoramic image of the local A, a panoramic camera A7 is installed in the camera bellows A5. FIG. 4(A) and FIG. 4(B) illustrate the basic principles of a solution to imaging of a panoramic camera. The panoramic camera is based on the plane mirror reflectance and virtual common optical center (panoramic camera in a virtual common optical center mode). The prismoid 1001 has three reflectance surfaces 1002, 1003, and 1004. Such surfaces are plane mirrors, and three cameras C01, C02 and C03 are placed under the mirrors. The virtual common optical center is described below, taking one camera C02 as an example. As shown in FIG. 4(B), L02 is an incident ray, and R02 is a reflective ray. The normal line 1006 is vertical to the reflective plane 1003, and the angle between the normal line 1006 and the horizontal line 1010 is θ. The vertical distance from the reflection point to the actual optical center 02 of the camera C02 is d. According to the light reflectance principles, the camera photographs a virtual image, and the virtual image has a virtual optical center 00. If the values of θ and d are set properly, the virtual optical centers of the cameras C01, C02 and C03 coincide, and three images that share an optical center are obtained. The three images are spliced to obtain an image which is seamlessly spliced in any depth. In designing a panoramic camera, the location of the optical center of the camera is as low as practicable in order to obtain a better vertical eye-to-eye effect. If the geometric height of the camera is constant, such an effect can be accomplished by reducing the horizontal distance between the camera and the reflection mirror. However, that distance is restricted by the size of the camera lens and viewfinder, and reduces the photographing perspective, as shown in FIG. 4(C). Another solution to the panoramic camera is a multi-camera aggregation model. Multiple images are photographed and spliced digitally to obtain a panoramic image (panoramic camera in the aggregation mode), as shown in FIG. 4(D). Because the optical center is inside the camera, such a camera model is unable to share the optical center by solely relying on the camera layout. Disparity exists in the overlap of the images. Image processing technologies need to be applied to achieve a good splicing effect. Another mode of the panoramic camera is to use a multi-camera array (panoramic camera in the multi-camera array mode), as shown in FIG. 4(E). The camera array may be in different forms according to different scenes, for example, linear array, ring array, or rectangular array. In the camera array, every camera has a low resolution, and the intervals between adjacent cameras are small. A large photographing overlap exists. The image splicing technology splices multiple camera images of low resolution into a high-resolution panoramic image. The basic principles of the image splicing algorithm are to estimate the internal parameters (such as focal length, principal point, and distortion) of multiple cameras and the inter-camera location parameters (such as spin matrix, and translation vector); through the estimated parameters and the algorithm, the images of the multiple cameras are aligned, the overlap is eliminated, the edges are blended, and the disparity is eliminated to obtain a high-resolution panoramic image.

The well-known image splicing technology is described below.

The basic principles of the image splicing algorithm are to estimate the internal parameters of multiple cameras and the inter-camera location parameters; through the estimated parameters and the algorithm, the images of the multiple cameras are aligned, the overlap is eliminated, the edges are blended, and the disparity is eliminated to obtain a high-resolution panoramic image. According to the projection geometry principles, when a spatial 3D point is projected to a camera imaging plane, the transformation relation is:

$$\bar{x}=K[R|t]X \quad (1)$$

$$K = \begin{bmatrix} f_x & s & u_0 \\ 0 & f_y & v_0 \\ 0 & 0 & 1 \end{bmatrix} \quad (2)$$

In the formula above, $\bar{x}$ is the homogeneous expression of planar coordinates; X is the homogeneous expression of the world coordinate system; $f_x$ and $f_y$ are equivalent focal lengths in the horizontal and vertical directions respectively; s is a distortion coefficient of the image; and $u_0, v_0$ are principal point coordinates of the image. R is the spin matrix of the camera, and t is the translation vector of the camera. K is an internal parameter of the camera, and R and t are external parameters of the camera. For multiple images which have overlaps and are photographed by two cameras or photographed by one camera in different locations, the imaging relation of a spatial point in two images is:

$$\bar{x}_1 = H_{01}\bar{x}_0 \quad (3)$$

H is a 3*3 matrix, whose freedom is 8. It represents the transformation relation between two imaging planes, and is called a homography. For a pure rotation camera system or a common optical center camera system which involves only rotational motion, H may be expressed as:

$$H_{01}=K_1 R_1 R_0^{-1} K_0^{-1} \quad (4)$$

Therefore, through a feature extraction algorithm such as Scale-Invariant Feature Transform (SIFT) algorithm, features are extracted in the overlap, multiple features are found, and a matching relation between features is set up. Multiple equation sets are created through (3), and the homography H between two images is worked out through an iterative optimization algorithm. After the H is worked out, the two images can be spliced together through coordinate transformation, and the pixels in the overlap are aligned. For the camera model that rotates in only the horizontal direction, we can use cylindrical coordinate transformation to convert the planar coordinates into cylindrical coordinates. In the cylindrical coordinates, the pixels are aligned through image translation. The transformation and inverse transformation of the cylindrical coordinates are:

$$x' = s\tan^{-1}\frac{x}{f} \qquad (5)$$
$$x = f\tan\frac{x'}{s}$$

$$y' = s\frac{y}{\sqrt{x^2+f^2}} \qquad (6)$$
$$y = f\frac{y'}{s}\sec\frac{x'}{s}$$

After the image is transformed according to the foregoing method, other factors need to be considered before an anticipated seamless panoramic image is obtained. A major factor is disparity. The existing algorithms can handle only the splicing in a certain depth of the image, namely, like the splicing on one plane. In theory, it is impossible to splice the objects in other depths seamlessly through one transformation. The objects except those in this depth involve fringes. It is hard to eliminate the fringes through the image processing algorithm. A better solution is to minimize disparity through a common optical center camera model. Another factor is luminance/chroma difference between images caused by exposure/color difference between the cameras, especially at the joint between two images. A simple solution is to perform Alpha blending at the overlap of the joint, and a better solution is to perform Laplacian pyramid blending or gradient domain blending on the whole image. After the relevant processing is finished, a better panoramic seamless image is obtained.

In order to obtain a better vertical eye-to-eye effect, the panoramic camera A7 is preferably installed on a height approximately equivalent to the line of sight A100 of the attendee (see FIG. 2). The panoramic camera A7 is made up of several ordinary color cameras. In order to photograph the rapidly moving objects in the scene, the color cameras need to be synchronized. Because the images obtained by multiple cameras may be not suitable for splicing directly, the three channels of video images need to be spliced through an image splicing algorithm to obtain a seamless panoramic image. The multiple channels of video streams output by the panoramic camera A7 may be transmitted directly to the audio and video communication device A8 which splices the images. Alternatively, the panoramic camera A7 is connected directly to a third-party device (not illustrated in the Figure) for splicing the images. After completion of splicing, the panoramic image is input to the audio and video communication device A8. Alternatively, the panoramic camera A7 splices the images, and inputs the spliced image to the audio and video communication device A8 through one or more channels video streams. The device capable of splicing images is called an image mosaics unit herein. The principles of the image mosaics unit are described above, and the connection relation between the image mosaics unit and other units is described in the following text about FIG. 6. As regards display, a single projector is unable to display the panoramic image properly. Preferably, the panoramic image is split into several parts, and each projector displays a part of the image. Because the projectors differ in location, luminance and chroma, the split panoramic image needs to be corrected geometrically, and the seam between adjacent images needs to be eliminated through luminance/chroma blending. Such a function is performed by an independent third-party device (not illustrated in the Figure), or integrated into the audio and video communication device A8. The device capable of image correcting/blending is called a correcting/blending unit herein. For details, see the description about FIG. 6 later. In order to hide the panoramic camera A7, the color of the camera is preferably the same as the color of the camera bellows background A6 behind so that the camera is hardly noticeable to the user.

Figure 5:
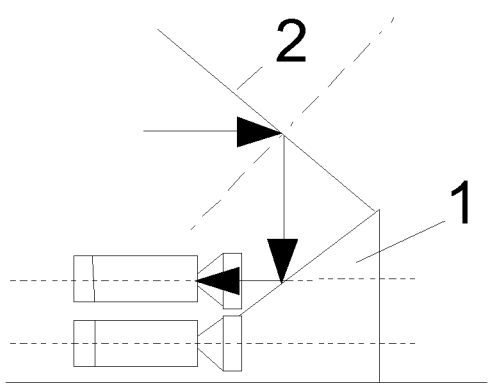
FIG. 5 is schematic diagram of a multi-reflective panoramic camera in a telepresence system in a first embodiment of the present invention.

In the Figure that illustrates the first embodiment, the panoramic camera 7 is placed vertically, and the incident rays are reflected into camera directly through a reflection mirror. In practice, the optical path of the incident ray is changed through repeated reflectance, and the panoramic camera may be placed as required. FIG. 5 shows a solution to placing the panoramic camera horizontally. A viewfinder 2 is added above the viewfinder 1 of the panoramic camera. Therefore, the horizontally transmitted rays are changed to vertically transmitted rays, and the location of the camera may be changed. Because there are multiple cameras, a proper reflectance plane needs to be designed on the upper side of each camera.

In order to prevent the local image A photographed by the panoramic camera A7 from being affected by the image projected by the projector A9, preferably, the first embodiment of the present invention uses a time division method to coordinate the collection of the camera A7 with the projection of the projector A9. According to the time division method, the working modes of the system are categorized into two modes: display mode and collection mode. In the display mode, the projector A9 projects the image of the remote end B to a transparent projection screen A4. At this time, the panoramic camera A7 is inactive and does not collect signals; in the collection mode, the projector A9 is inactive and does not project images, and the panoramic camera A7 photographs the scene through a transparent projection screen A4. In order to coordinate the camera A7 and the projector A9, a special synchronizing unit A16 is required to output synchronization signals to the panoramic camera A7 and the projector A9, and control the working mode of the two devices. For example, the synchronizing unit A16 controls the panoramic camera A7 to collect signals in the vertical flyback interval between two frames/scenes of images of the projector A9. At this time, however, the exposure time of the panoramic camera A7 is shorter, and the luminance of the image is lower. In order to solve such problems, the camera of a shorter exposure time may be applied, or the refresh rate of the projector may be reduced.

As described above, the panoramic camera B7 obtains a panoramic image of the scene of the remote user B15, and the image is presented on a projection screen A4 locally. Therefore, the local user A15 feels as if the user is surrounded by the remote scene, and perceives a seamlessly displayed panoramic image, without the noticeable impression of speaking to a screen. The user's sense of immersion is enhanced. Moreover, the image of the remote user B15 is presented on a local transparent projection screen A4, and the surroundings of the remote user B15 are a dark background, and will not be imaged on the transparent projection screen A4. Therefore, the local user A15 can see the background A6 of the camera bellows A5 through such a part. A physical distance exists between the transparent projection screen A4 and the background A6 of the camera bellows A5, and the background A6 of the camera bellows A5 is decorated specially, which brings a depth illusion to the user. Therefore, the local user A15 perceives the depth of the image of the remote user B15. Moreover, as controlled by the synchronizing unit A16, the panoramic camera A7 is free from impact of the projection of the projector A9 when photographing the local image A. Likewise, the panoramic camera B7 is free from impact of the projection of the projector B9 when photographing the remote image B. Therefore, the cameras may be placed behind the projection screen center along the line of sight of the attendee, thus avoiding vertical disparity and enabling the opposite attendee to enjoy eye contact.

The synchronizing unit A16/B16 enables face-to-face video communication. In addition, the telepresence system involves remote collaboration tasks, for example, two design teams need to see the design prototype. The existing telepresence system supports 2D videos only, and the user is unable to see an object that takes on a depth sense. The solution put forward in this embodiment may use a stereoscopic camera as an object camera to accomplish 3D videos when presenting the object. As shown in FIG. 2, the stereoscopic camera B10 on the remote end B collects the 3D image information of an object to be presented, for example, "left eye image+right eye image", or "left eye image+depth image", and inputs the information to the audio and video communication device B8 capable of 3D video coding. The audio and video communication device B8 processes the 3D image, encodes the image, and sends it to the audio and video communication device A8 on the local end A. The audio and video communication device A8 on the local end A decodes and presents the 3D video code streams. If a 3D video presence device exists locally, the video is presented as 3D video; otherwise, the video is presented as 2D video. For example, if the auxiliary monitor A12 on the local end A is a 3D monitor, the audio and video communication device A8 outputs a video of the 3D format to the A12 for displaying. If the local auxiliary monitor A12 is an ordinary 2D monitor, the audio and video communication device A8 outputs a video of the 2D format to the A12 for displaying. The 3D video presence devices include 3D glasses, automatic stereoscopic monitor, and multi-perspective 3D monitor.

In order to give pleasant immersive audio experience, a microphone array A3 and a speaker array A11 are preferred to present audios. The backgrounds of the microphone array and the speaker array are outlined below. In a telepresence system, the reproduction of the audio includes the reproduction of acoustics and the reproduction of the stereoscopic sense. The reproduction of acoustics can be accomplished through an efficient wide-frequency compression algorithm. The stereoscopic sense brings impression of locations and directions, enhances the impression of being in the same room, makes the voice more understandable, and makes the speechmaker quickly identifiable. The first embodiment of the present invention uses multiple microphones or microphone arrays to collect audios, and uses multiple speakers or speaker arrays to present audios, thus improving the effect of reproduction of the stereoscopic sense of the sound. The microphone array is a system of unidirectional microphones distributed in a certain geometrical structure. A traditional directional microphone generally collects only one channel of signals, but a microphone array system collects multiple channels of signals. Because the microphones are located differently, the collected data differs chronologically or spatially. Through the signal processing technology, the required information may be extracted from multiple channels of signals. The microphone array system is characterized by space selection. The beams generated by the microphone aim at the sound source, and suppress the sound of other speechmakers and the environment noise, thus giving high-quality sound source signals. Currently, sound source positioning is a main application scenario of the microphone array. The positioning based on a microphone array is to determine the spatial location of the sound source by using the microphones distributed in a specific geometrical layout. If the sound source positioning algorithm based on a microphone array comes in three types: controllable beam formation technology based on the maximum output power, direction determining technology based on high-resolution spectrum estimation, and Time Difference Of Arrival (TDOA)-based technology. The first method is to filter the voice signals received by the microphone array, sum up the weighted value of the voice signals, and then control the microphone to point toward the direction that makes the maximum output power of the beam. The second method is to determine the direction angle by working out the relevant matrix between the microphone signals, and determine the location of the sound source. The third method is to work out the time differences of the sound arriving at the microphones in different locations, use such time differences to work out the distance differences of the sound arriving at the microphones in different locations, and then determine the location of the sound source through search or geometrical knowledge. The speaker array can rebuild and reproduce the sound field according to the input audio signals and location information. The speaker array can combine multiple sound field units in a certain way to amplify sound. Compared with a single speaker which radiates sound directly, the speaker array increases the sound power, increases the sound radiation effect in the case of low frequency, improves the directionality and unevenness of the sound field, and improves the voice clarity in a reverberation environment. The speaker array can be based on a wavefront synthesis technology.

The microphone array A3 may be a linear microphone array or a circular microphone array, and is placed on the table or suspended from the ceiling. The speaker array A11 includes many speakers, which are integrated with the camera bellows A5. The distribution direction of the speakers is the same as the distribution direction of the remote attendees displayed on the projection screen A5. In the conference process, through the microphone array B3 on the remote end B, the audio and video communication device B8 can detect the location of a speaking attendee B15, and transmit the audio signals on the remote end B and the location information of the attendee B15 to the audio and video communication device A8 on the local end A. The speaker array A11 can rebuild and reproduce the sound field according to the input audio signals and location information. In this way, the local user A15 feels that the sound of the remote user B15 is uttered from the B15 location on the screen, and obtains the experience like a face-to-face talk.

Figure 6:
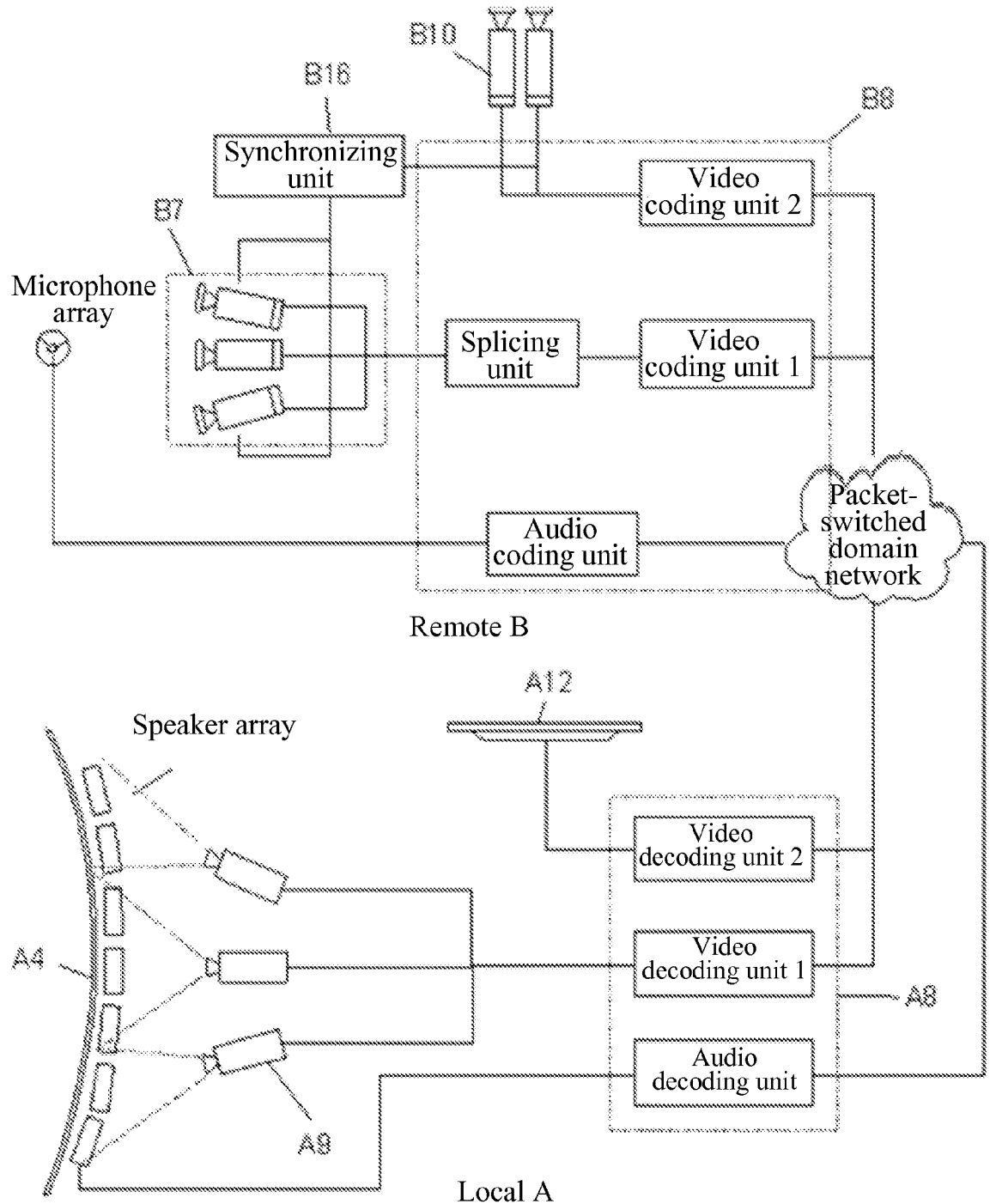
FIG. 6 is a schematic diagram of a telepresence system in a first embodiment of the present invention.

FIG. 6 displays the system working flowchart of the first embodiment, where the remote end B transmits audio and video information to local A.

On the remote end B, the panoramic camera B7 (composed of multiple cameras) collects images of the scenes in different perspectives synchronously under control of the synchronizing unit B16. The multiple collected images are sent to the image mosaics unit for splicing into a panoramic image of a remote scene B. This panoramic image is output from the image mosaics unit, processed and further output to the video coding unit 1 for coding, and then transmitted through a packet-switched domain network in the form of packet code streams. It is worthy of attention that the resolution of the spliced images may be very high, and one video coding unit 1 may be unable to encode the spliced image in real time. The spliced image may need to be split into several parts, and output to multiple video coders synchronously for coding. After coding, the image may form one or more code streams, which are transmitted through the packet-switched domain network. Due to distributed coding and the delay and jitters caused in the network transmission, the code streams may be out of sync. Therefore, the code streams may need to be labeled (for example, through timestamps). At the decoder, the code streams are synchronized according to the labels. Likewise, the microphone array on the remote end B collects the audio signals of the scene, and encodes the signals through an audio coding unit to form encoded audio code streams, which are transmitted through the network in the form of data packets. In order to prevent loss of synchronization between the audio and the video, it is better to synchronize for the audio data and the video data. The synchronization of audio data and video data is a prior art in the audio and video field, and is not repeated herein any further. Because the remote end B uses a microphone array to collect the audio signals, the audio positioning algorithm is also capable of calculating out the location information of a speaking attendee. The location information may be output to the local end through the network. Apart from the panoramic camera B7, one or more object cameras B10 photograph the objects that need to be presented in the scene. If there are multiple object cameras B10, they may make up a stereoscopic camera for obtaining the 3D image of the scene. In this case, a synchronizing unit B16 also exists between the cameras for synchronizing the collection. One or more video streams of the object camera B10 are input to the video coding unit 2 for coding. The video coding unit 2 supports 2D/3D video coding formats, and the encoded code stream data is transmitted through the packet-switched domain network.

On the local end A, the video coding unit 1 receives the panoramic video code streams from the remote end B for decoding. Because the resolution of the panoramic image may be very high, one video decoding unit 1 is unable to finish decoding the image, and multiple video decoding units may need to work concurrently. In the decoding, the sequence of playing the video image frames needs to be determined according to the synchronization label in the code streams. After decoding, the image(s) may be a complete panoramic image or multiple split images. For a complete panoramic image, the image needs to be split into multiple images, which are output to multiple projectors A9 synchronously. The multiple projectors A9 presents the images on the projection screen A4 seamlessly. Before the projector presents the image, because the projectors differ in location, luminance, and chroma, the image is preferably corrected geometrically through a correcting/blending unit, and the seam between adjacent images needs to be eliminated through luminance/chroma blending. The audio data code streams are decoded by the audio decoding unit into audio data signals, which are output to the speaker array. According to the location information of the attendee on the remote end B, one or more speakers in the speaker array closest to the remote attendee displayed on the projection screen A4 may be selected to to present the audio of the remote attendee. The video code streams of the object camera B10 on the opposite side B are decoded by the video decoding unit 2, and presented by the auxiliary monitor A12. If the auxiliary monitor A12 supports 3D videos, the videos are presented as 3D videos; if the auxiliary monitor A12 supports 2D videos only, the videos are presented as 2D videos. Therefore, a complete audio and video communication device A8 or B8 includes: an image mosaics unit, video coding units 1 and 2, an audio coding unit, video decoding units 1 and 2, and an audio decoding unit.

Figure 7:
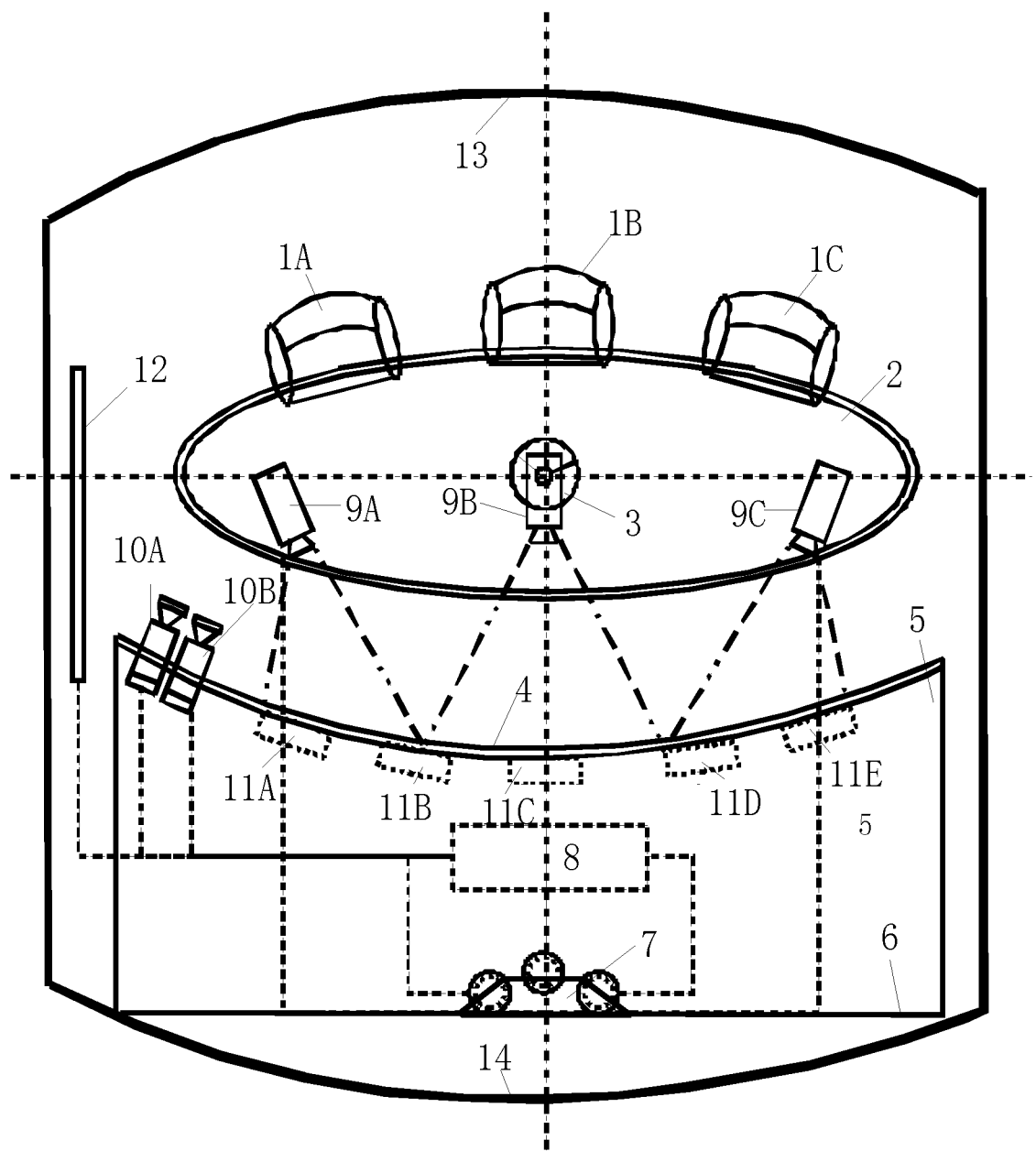
FIG. 7 is the second planform of a conference room layout in a telepresence system in a first embodiment of the present invention.
Figure 8:
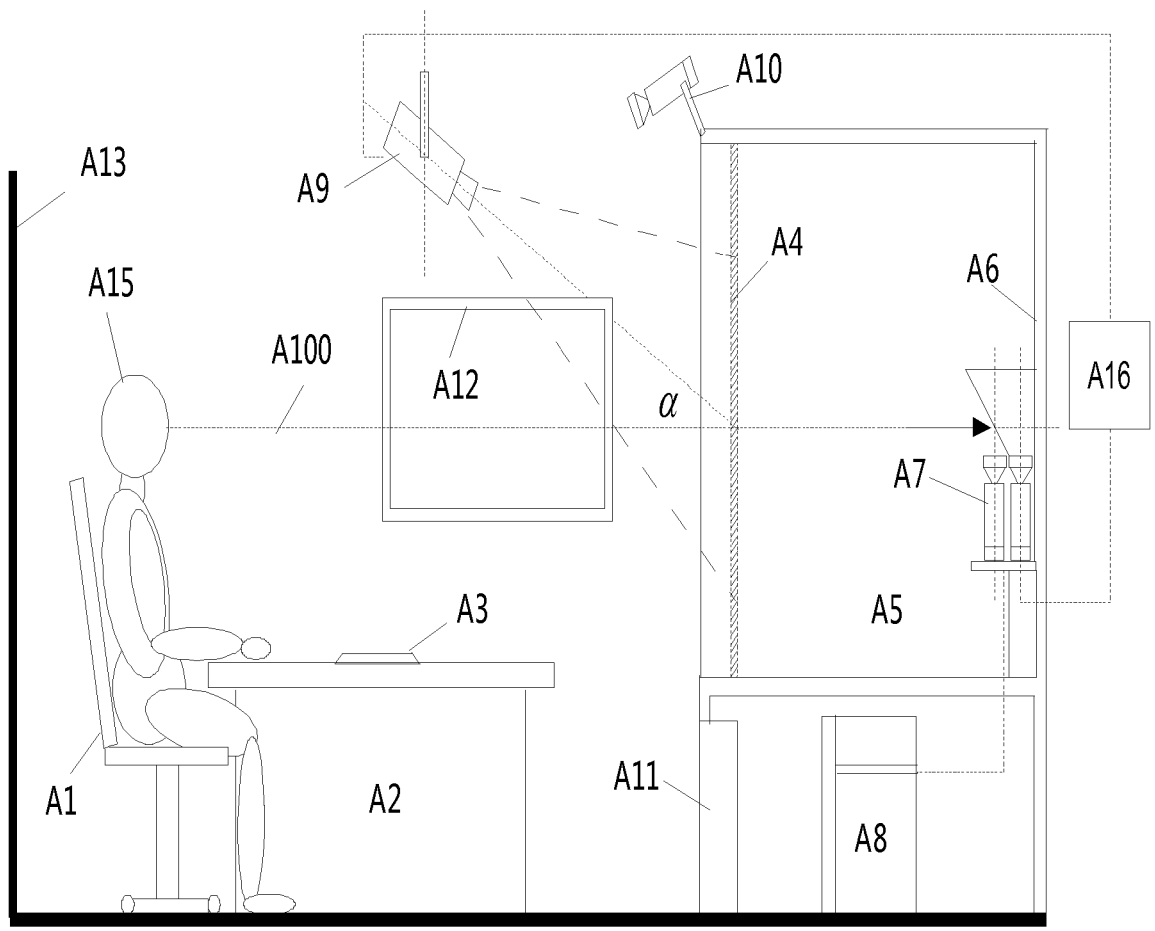
FIG. 8 is the second schematic diagram of a telepresence system in a first embodiment of the present invention.

FIG. 7 is the second planform of a conference room layout in a telepresence system in the first embodiment of the present invention, and FIG. 8 is the second schematic diagram of a telepresence system in the first embodiment of the present invention. The solution is based on the front projection technology. The projector A9 may be placed in front of the projection screen A4, and suspended above the conference table A2 (as shown in the Figure) or below the conference table for projection. The solution is superior because the rays emitted by the projector A9 causes no interference to the user.

Figure 9:
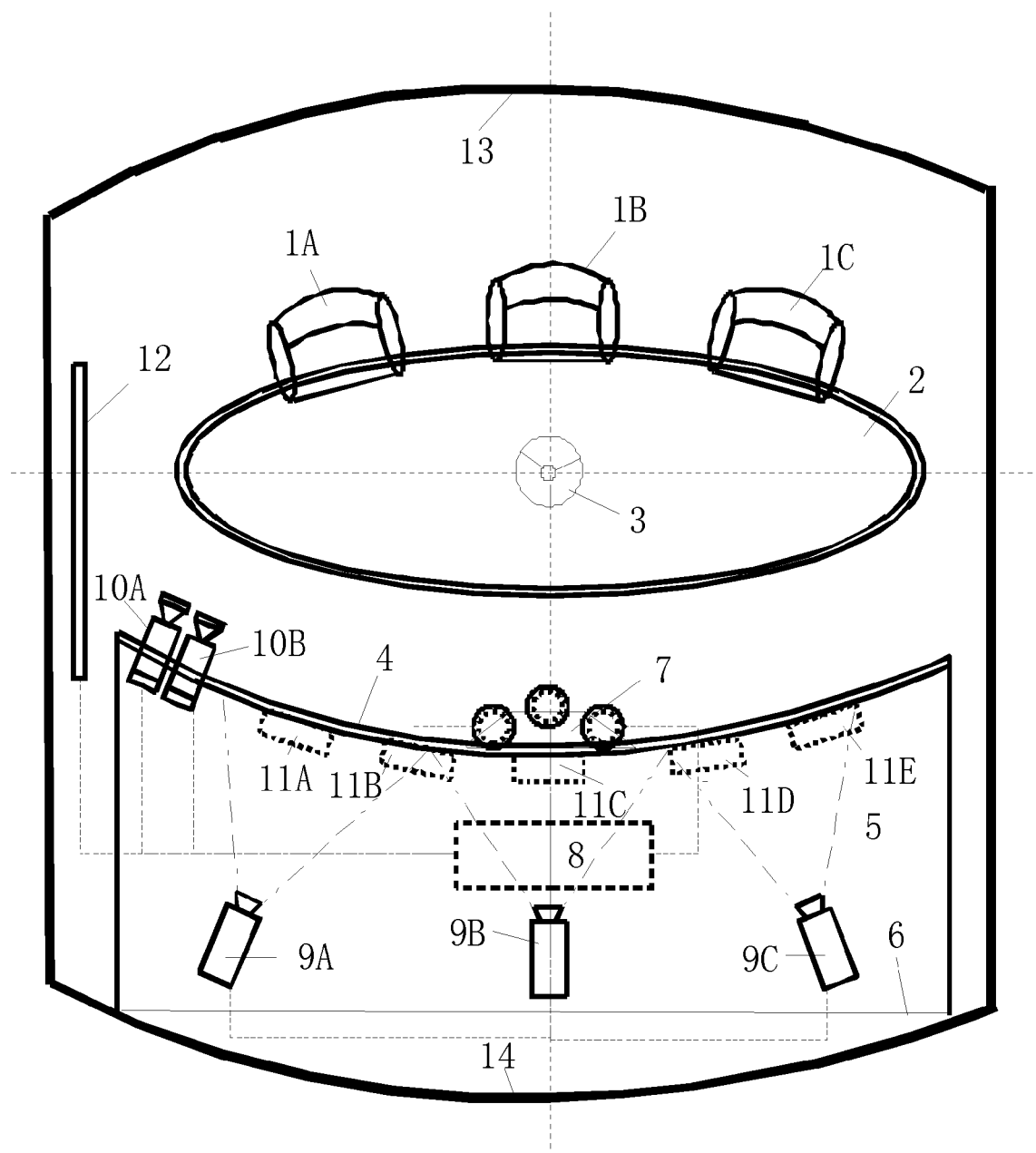
FIG. 9 is the third planform of a conference room layout in a telepresence system in a first embodiment of the present invention.
Figure 10:
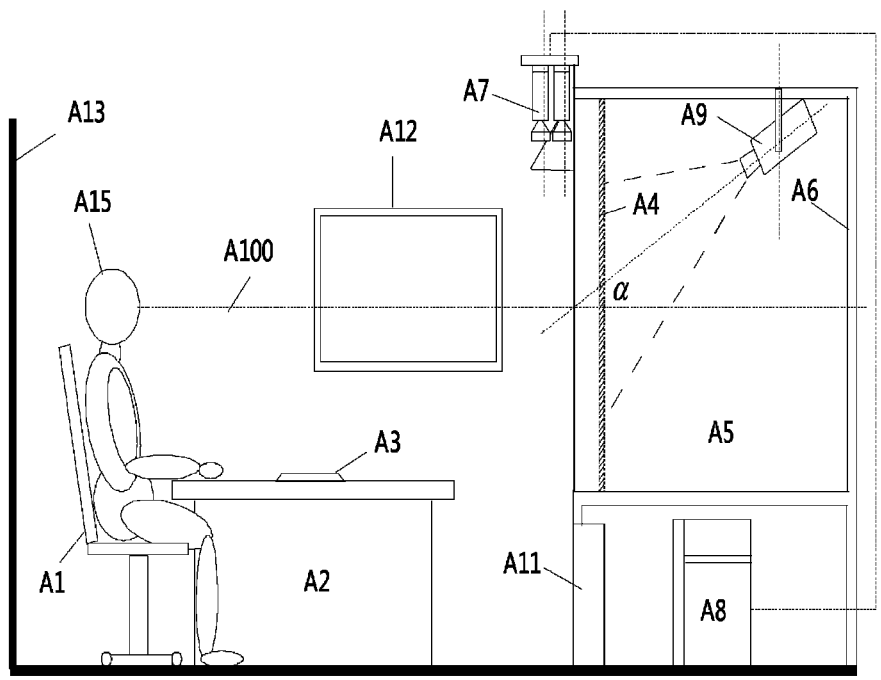
FIG. 10 is the third schematic diagram of a telepresence system in a first embodiment of the present invention.

FIG. 9 is the third planform of a conference room layout in a simplified solution in the first embodiment of the present invention. FIG. 10 is the third schematic diagram of a conference room layout in a simplified solution in the first embodiment of the present invention. In the simplified solution, the panoramic camera A7 is placed above the projection screen A4 to obtain a panoramic image of the scene. In this case, no synchronizing unit A16 is required for synchronizing the collection of the panoramic camera A7 and the projection of the projector A9, thus simplifying the design and reducing the cost of the panoramic camera A7 and the projector A9. However, because the panoramic camera 7 is not placed on the line of sight of the user A15, the vertical eye-to-eye effect is deteriorated. Generally, if the vertical perspective difference is less than seven degrees (<7°), the vertical eye-to-eye effect is acceptable. In order to reduce the vertical perspective, the viewfinder of the panoramic camera A7 may be placed below the color camera.

In the simplified solution shown in FIG. 9 and FIG. 10, the projection screen A4 may be a holographic transparent projection screen or an ordinary projection screen. With a holographic projection screen, the user can perceive the depth of the scene; with the ordinary rear projector, it is impossible to present the depth sense of the scene, and the backdrop A13 behind the user and the backdrop A6 of the camera bellows A5 do not need to be decorated specially.

It can be seen from the above description that, in the three solutions in the first embodiment, a panoramic camera (A7 or B7) is employed, the panorama of the local conference room can be photographed, and the opposite attendee can obtain a conference panorama, thus bringing a good effect of presenting the panorama in the telepresence system.

No matter whether the projection screen A4 or B4 is an ordinary projection screen or a holographic transparent projection screen, the projection screen presents the images in an integrated way, thus implementing seamless presence and overcoming the defect brought by the television flanges when multiple flat televisions are combined.

Preferably, the projection screen A4 or B4 is a holographic transparent projection screen, which provides depth presence for the attendees.

Preferably, through control of a synchronizing unit A16 or B16, the panoramic camera A7 or B7 is free from impact caused by the image projection of the projector A9 or B9 when photographing the images on the local end A or remote end B, thus avoiding vertical perspectives and enabling the opposite attendee to enjoy the eye contact. The panoramic camera A7 or B7 may also be placed above the projection screen A4 or B4 to obtain a panoramic image of the scene. In this case, the synchronizing unit A16 or B16 is omissible, thus simplifying the design and reducing the cost. In order to reduce the vertical perspectives, the viewfinder of the panoramic camera A7 or B7 may be placed below the color camera.

Preferably, the projector A9 or B9 is set in the camera bellows A5 or B5 so that the projector A9 is free from impact of environmental light. The projector A9 or B9 may be placed in front of the projection screen A4 or B4 through a front projection technology, or suspended above the conference table or below the conference table. In this way, the rays of the projector A9 or B9 cause no interference to the user in the holographic transparent projection.

The second embodiment of the present invention is described below.

Figure 11:
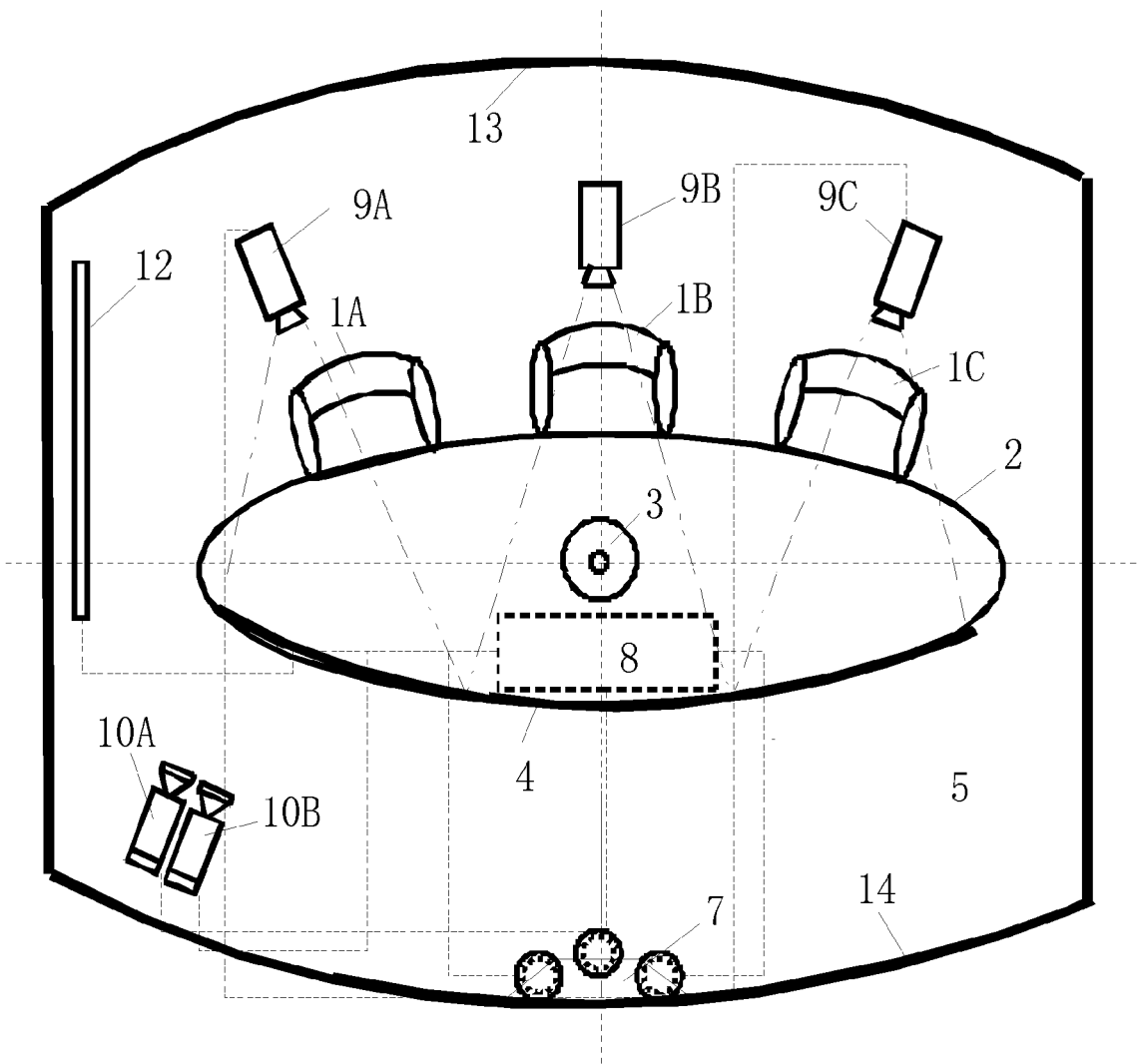
FIG. 11 is a planform of a conference room layout in a telepresence system in a second embodiment of the present invention.
Figure 12:
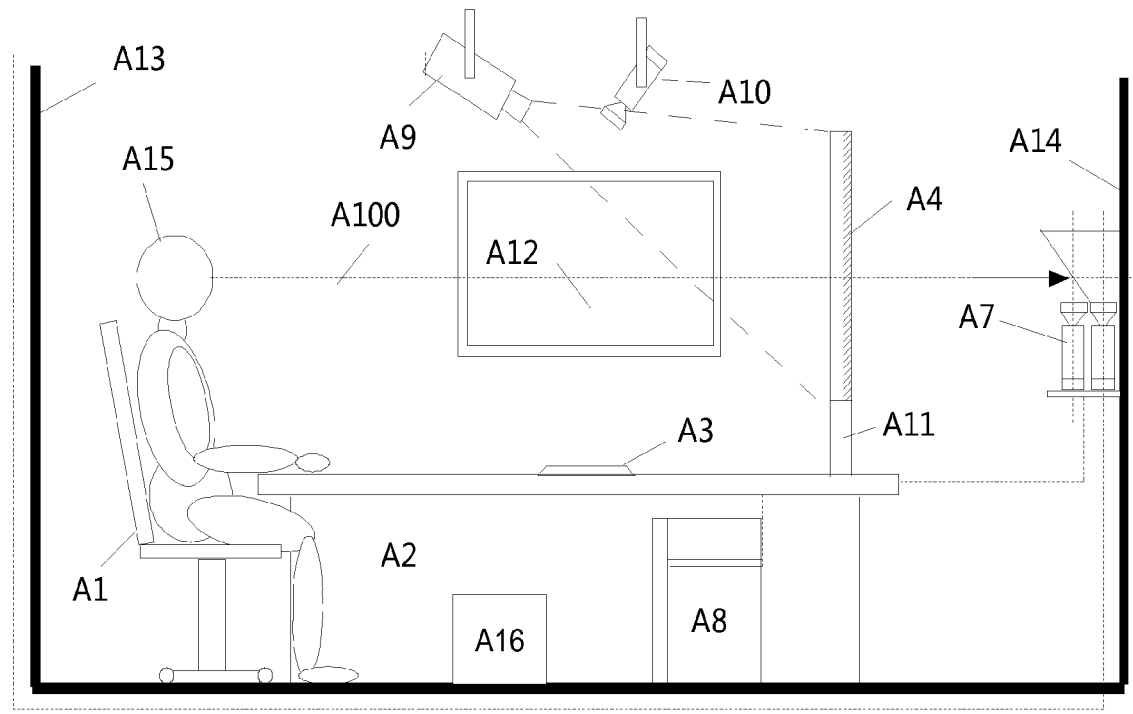
FIG. 12 is the first schematic diagram of a telepresence system in a second embodiment of the present invention.

FIG. 11 is a planform of a conference room layout in a telepresence system in the second embodiment of the present invention. Corresponding to FIG. 11, FIG. 12 is the first schematic diagram of a telepresence system in the second embodiment of the present invention. In the second embodiment, the camera bellows are omitted, and the projection screen 4 is directly placed opposite to the seats 1A, 1B, and 1C. In actual design, the projection screen may be designed as an elevation structure. The projection screen 4 is elevated up or hidden in the table 2 when it is idle, and is lowered or comes up from the table 2 when it works. In this way, the table 2 can be used for ordinary conferences when no videoconference is underway. Because the projection screen 4 is very thin, the speaker may be a very thin flat panel speaker placed below the projection screen 4; or a vibrating module is fitted onto the screen directly so that the screen becomes a speaker. In order to accomplish a good vertical eye-to-eye effect, the panoramic camera 7 may be hidden into the background wall 14 behind the projection screen 4. Through special decoration, the panoramic camera 7 and the background wall 14 are blended together. The projector 9 needs to be synchronized with the panoramic camera 7 through a synchronizing unit A16 in a way described in the first embodiment. The projector 9 in this embodiment may employ a front projection mode (shown in FIG. 11) or rear projection mode.

Figure 13:
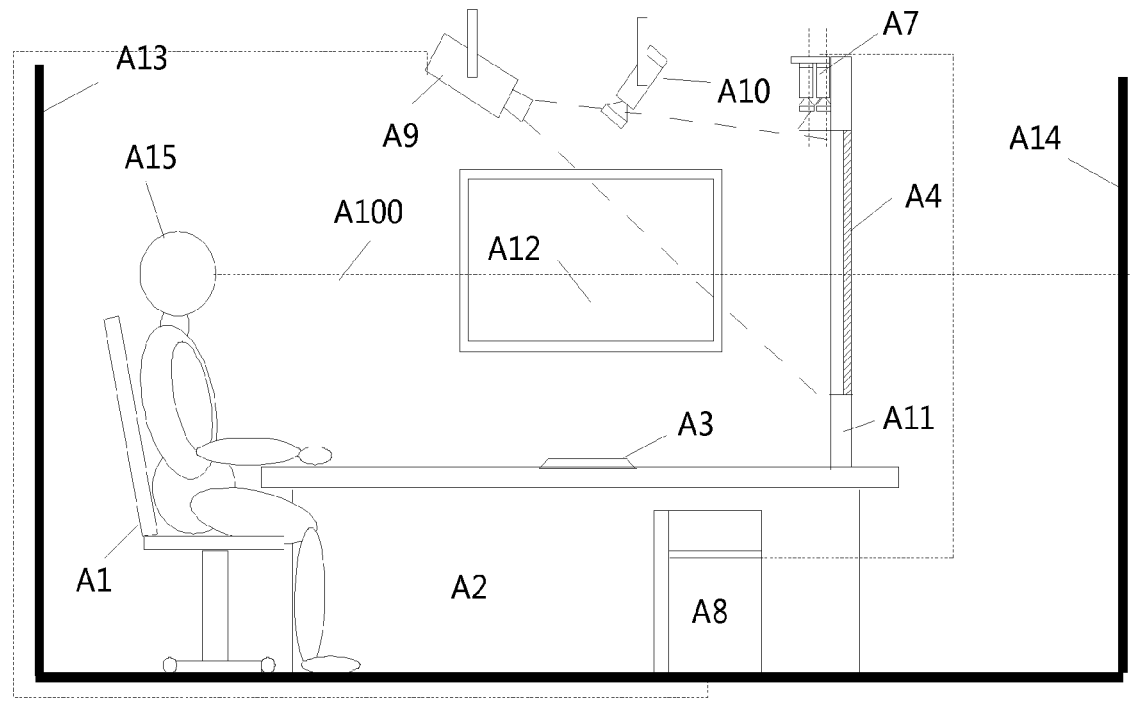
FIG. 13 is the second schematic diagram of a telepresence system in a second embodiment of the present invention.

Another design solution in the second embodiment 2 is to put the panoramic camera 7 above the projection screen A. FIG. 13 is the second schematic diagram of a telepresence system in the second embodiment of the present invention. In practice, a supporting flange of a specific thickness is designed, the projection screen A4 is embedded into the flange, and the panoramic camera A7 is placed in front of the flange or embedded into the flange. In the case, no synchronizing unit is required for synchronizing collection of the panoramic camera A7 and projection of the projector A9. However, because the panoramic camera 7 is not placed on the line of sight of the user A15, the vertical eye-to-eye effect is deteriorated. Generally, if the vertical perspective difference is less than seven degrees (<7°), the vertical eye-to-eye effect is acceptable. In order to reduce the vertical perspective, the viewfinder of the panoramic camera A7 may be placed below the color camera.

In the second embodiment, as shown in FIG. 11, because the projection screen 4 is directly placed opposite to the seat, the projection screen can be retracted when it is idle. Therefore, this solution is compatible with the traditional conference. That is, the relevant devices can be hidden when no telepresence conference is underway, and the conference room is available for ordinary conferences.

The third embodiment of the present invention is described below.

Figure 14:
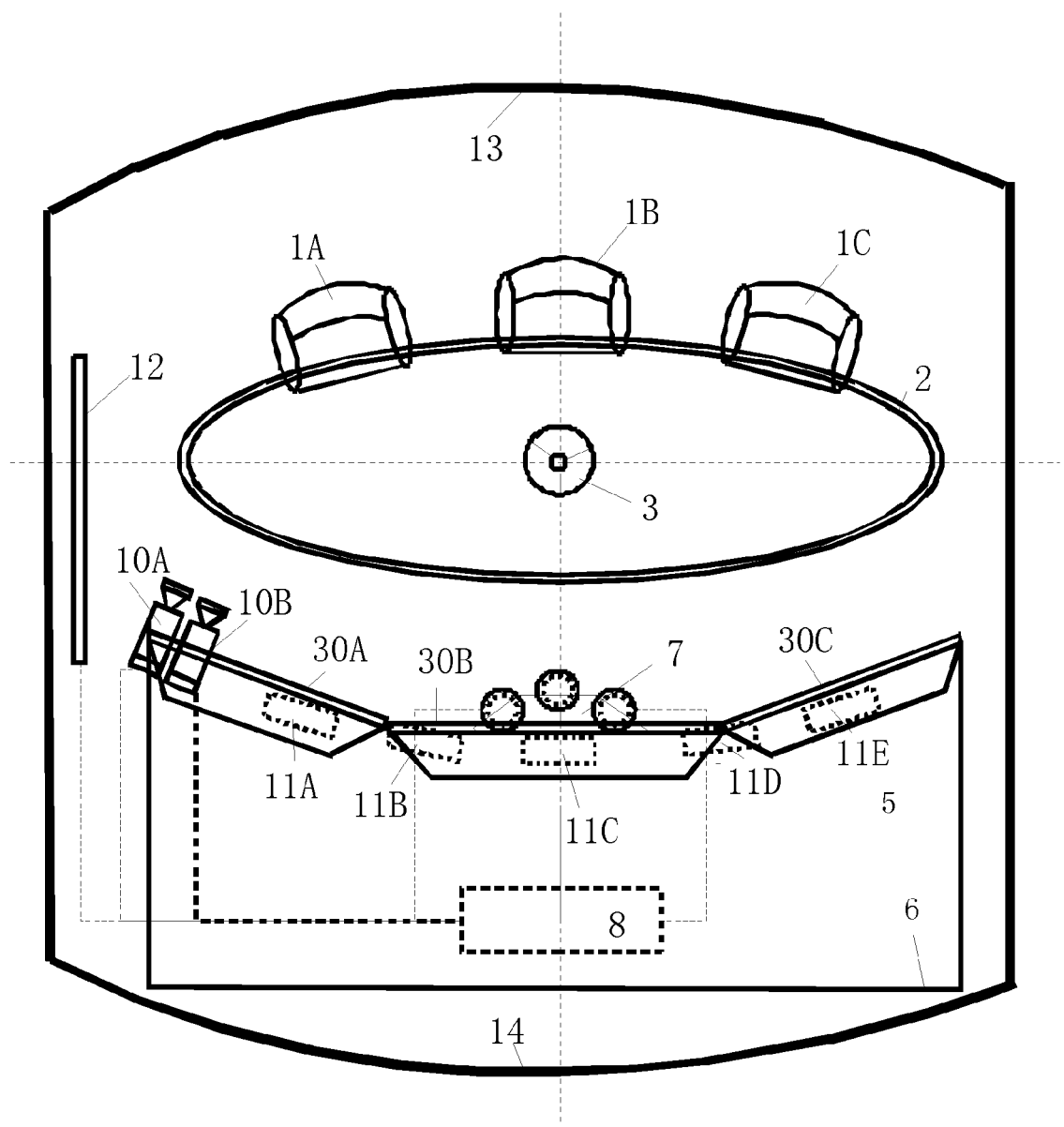
FIG. 14 is a planform of a conference room layout in a telepresence system in a third embodiment of the present invention.
Figure 15:
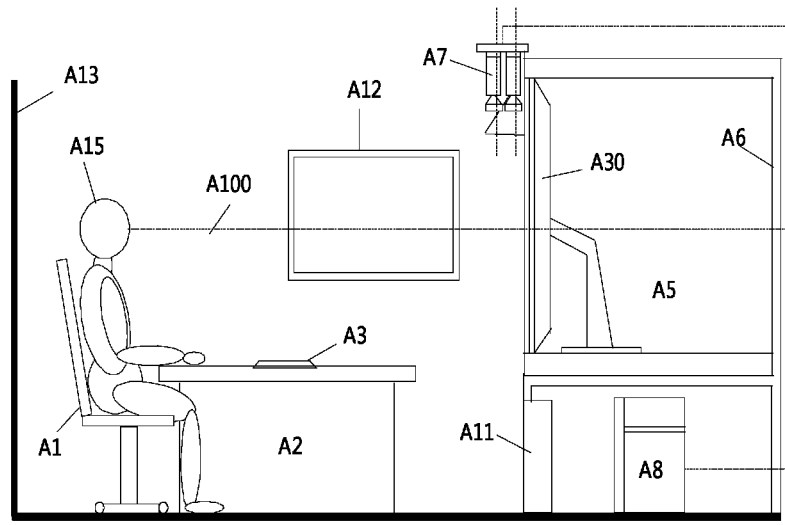
FIG. 15 is a schematic diagram of a telepresence system in the third embodiment of a present invention.

FIG. 14 is a planform of a conference room layout in a telepresence system in the third embodiment of the present invention. FIG. 15 is a schematic diagram of a telepresence system in the third embodiment of the present invention. The third embodiment further simplifies the solution. Instead of a projection screen, large-sized televisions 30A, 30B, and 30C are spliced into a display system. The televisions may be LCD television, PDP television, or Digital Light Processing (DLP) rear projection television. The panoramic camera A7 is placed above the monitor to photograph the local scene. Because the television presence is unable to render the depth effect, the backdrop A13 behind the user and the backdrop A6 of the camera bellows need no special decoration.

It can be seen from the above description that, the third embodiment is an upgrade on the basis of the existing telepresence system. It gives a good effect of panoramic presence by only replacing the ordinary camera with a panoramic camera.

The fourth embodiment of the present invention is described below.

Figure 16:
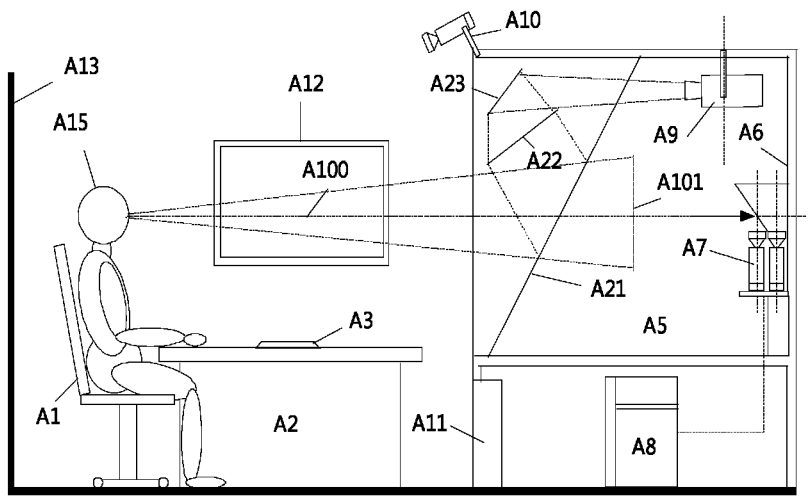
FIG. 16 is a schematic diagram of a telepresence system in a fourth embodiment of the present invention.

FIG. 16 shows a telepresence system in the fourth embodiment of the present invention. A semi-reflective semi-transparent mirror is used in this embodiment to present depth. The holographic transparent projection screen is replaced with a semi-reflective semi-transparent mirror A21. The semi-reflective semi-transparent mirror is installed in front of the camera bellows. The projection screen A22 is sideways above the semi-reflective semi-transparent mirror, and a certain angle exists between the projection screen and the semi-reflective semi-transparent mirror. The projection screen A22 forms images by means of rear projection. The images projected by the projector A9 are reflected by the reflection mirror A23, and then change to images on the projection screen A22. The semi-reflective semi-transparent mirror A21 makes the images at A22 into virtual images A101, and makes the local A15 see the images at a certain depth. The panoramic camera A7 collects images of the user through the semi-reflective semi-transparent mirror A21, and is blended with the background A6 of the camera bellows A5. A dark background behind the remote user enables the local background A6 decorated specially to be visible to the local user A15 through the dark area except the bright area where the body of the remote user is situated. Because a physical distance exists between the image A101 of the remote user visible to the local user and the local background A6, it looks as if the image of the remote user in the eye of the local user is in front of the background. It is to be noticed that the reflection mirror A23 is optional. When the reflection mirror A23 is omitted, the projector A9 may employ the front projection solution.

It can be seen from the above description that, the fourth embodiment accomplishes panoramic presence through a panoramic camera A7, and accomplishes depth presence and eye contact through a semi-reflective semi-transparent mirror A21 on the basis of realizing seamless display through projection.

The fifth embodiment of the present invention is described below.

Figure 17:
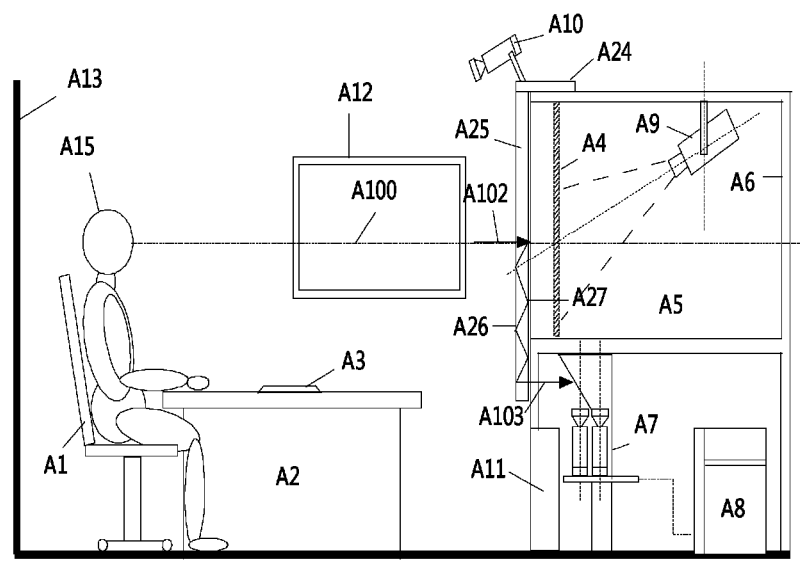
FIG. 17 is a schematic diagram of a telepresence system in a fifth embodiment of the present invention.

FIG. 17 is a schematic diagram of a telepresence system in the fifth embodiment of the present invention. This embodiment employs a transparent optical conduction component A25, which has an optical redirection area A25 for inputting images. As a waveguide device, A24 transmits the image of the attendee A15 to the panoramic camera A7 at the bottom of the camera bellows A5 solely through inner reflection. As shown in the Figure, the incident ray A102 is reflected repeatedly between two inner surfaces A26 and A27 of the light guide component, and is finally radiated as an emergent ray A103 at the bottom of the camera bellows A5 and collected by the panoramic camera A7. The optical conduction component is placed in front of the projection screen A4, and the input area A25 covers the surface of the projection screen A4. The A25 needs to be transparent enough to prevent causing interference to the user A15. The inner surfaces A26 and A27 of the input area may be accomplished through holographically derived grating. The component is a transparent panel made up of glass or plastic.

It can be seen from the above description that, the fifth embodiment accomplishes panoramic presence through a panoramic camera A7, accomplishes seamless display through a projection screen A4, and accomplishes eye contact through an optical conduction component A25. Preferably, the projection screen A4 is a holographic transparent projection screen capable of presenting depth.

The sixth embodiment of the present invention is described below.

This embodiment accomplishes a panoramic telepresence system that supports the vertical eye-to-eye effect through a polarizer.

The principles of the well-known polarized light are outlined below.

Light waves are transverse waves. That is, the vibration direction of the light wave vector is vertical to the propagation direction of the light. Generally, for the light wave emitted from a light source, the vibration of the light wave vector takes on an irregular trend in the direction vertical to the light propagation direction. Averagely, in all directions in the space, the distribution of light wave vectors is deemed as sharing equal chances. Their sum is symmetrical with that in the light propagation direction. That is, the light vector is characterized axial symmetry, even distribution, and equal amplitude of vibration in all directions. Such light is called natural light. Polarized light refers to the light wave whose light vector vibration direction does not change or changes regularly. Depending on the nature, polarized light is categorized into planar polarized light (linear polarized light), circular polarized light, elliptical polarized light, and partially polarized light. If the vibration direction of the electric vector of the light wave is limited to a definite plane, the polarized light is called planar polarized light; and, if the orbit is a straight line in the propagation process, the polarized light is called linear polarized light. If the electric vector of the light wave changes regularly with time, namely, the end orbit of the electric vector is vertically a straight line in the propagation process, the polarized light is called linear polarized light. If the electric vector of the light wave changes regularly with time, namely, the end orbit of the electric vector is circular or elliptical on the plane vertical to the propagation direction, the polarized light is called circular or elliptical polarized light. If the vibration of the electric vector of the light wave is relatively dominant only in a specific direction in the propagation process, the polarized light is called a partially polarized light. A polarizer is a thin film made manually. Crystal particles which absorb selectively are arranged in the transparent layers regularly in a special way to form the polarizer. The polarizer is permeable to the light in a certain vibration direction of the electric vector (this direction is called a polarization direction), but absorbs the vertically vibrating light, namely, the polarizer takes on dichroism.

Figure 18:
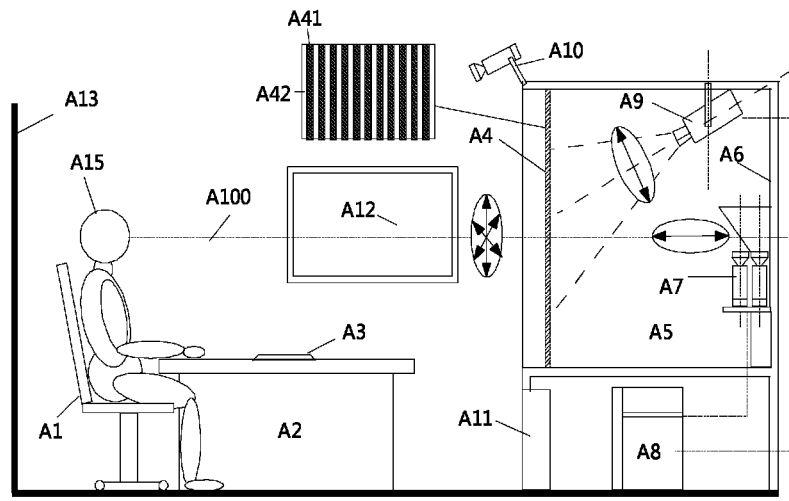
FIG. 18 is a schematic diagram of a telepresence system in a sixth embodiment of the present invention.

FIG. 18 is a schematic diagram of a telepresence system in the sixth embodiment of the present invention. In this embodiment, a linear polarizer is placed in front of the lens of the projector A9 and the panoramic camera A7. The polarization angle of the linear polarizer of the projector A9 is different from the polarization angle of the linear polarizer of the panoramic camera A7. (The polarization direction of the polarizer in front of the panoramic camera is different from the polarization direction of the light projected by the projector. That is because, according to the principles of polarized light, the light projected by the projector in this case is unable to enter the camera through the polarizer in front of the panoramic camera.) In ideal conditions, the difference is 90 degrees. That is, the polarization direction of the projector A9 is vertical to the polarization direction of the panoramic camera A7. For example, the polarization direction of the projector A9 is vertical, but the polarization direction of the panoramic camera A7 is horizontal. A projection screen A4 made from special materials may be used instead of the polarizer in front of the camera. The projection screen is a semitransparent screen interwoven from the polarizer material A41 of the panoramic camera A7 and other materials A42. In this way, the input circular polarized light of the scene changes to horizontal linear polarized light after passing through the projection screen A4, and can be collected by the panoramic camera A7; the light projected by the projector A9 is vertical linear polarized light and is unable to pass through the horizontal linear polarizer of the camera A7, and thus is not collectible by the camera A7. In this way, the photographing of the panoramic camera A7 and the projection of the projector A9 generate no interference.

It can be seen from the above description that, the sixth embodiment accomplishes panoramic presence through a panoramic camera A7, accomplishes seamless display through a projection screen A4, and accomplishes eye contact through the polarizer added in front of the camera and the projector.

The seventh embodiment of the present invention is described below.

The seventh embodiment aims to solve the layout of the dark background behind the user in the preceding solutions. In the preceding solution, in order to present depth, the background behind the user needs to be fixed as a dark background, for example, a black curtain or black painted wall. Such a background may be unacceptable to the user in some conference rooms. For example, the user feels that the dark background is not harmonized with the decoration design of the conference room.

Figure 19:
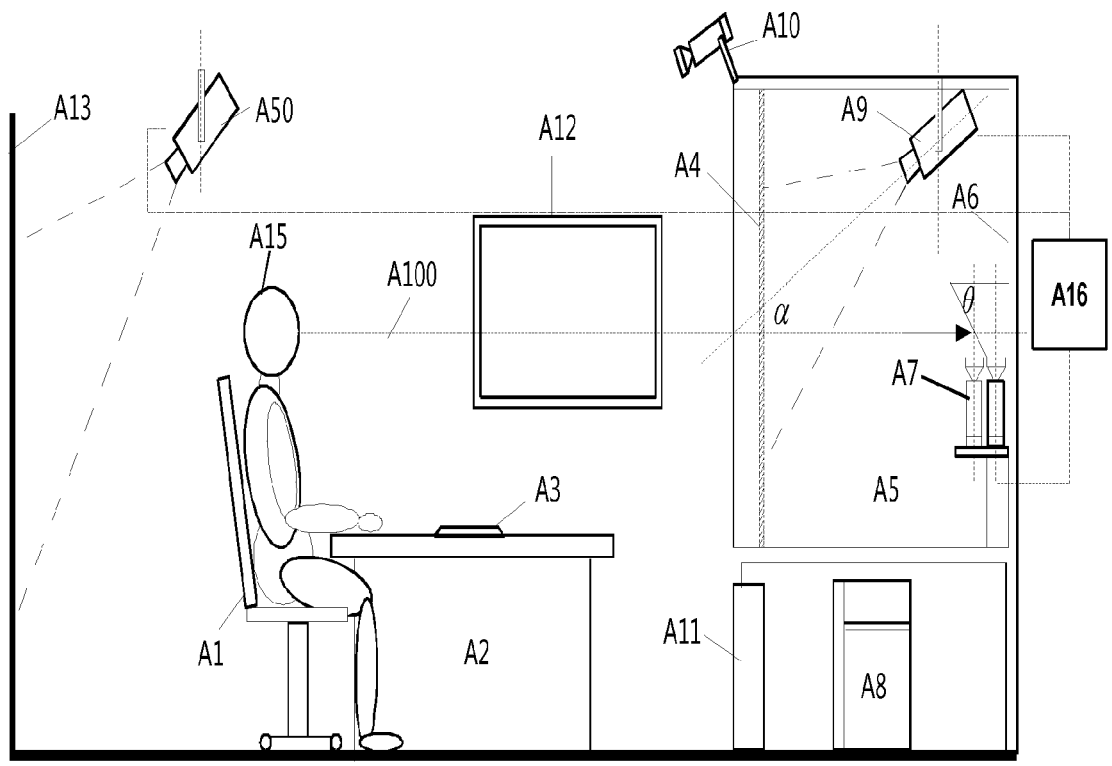
FIG. 19 is the first schematic diagram of a telepresence system in a seventh embodiment of the present invention.

FIG. 19 is the first schematic diagram of a telepresence system in the seventh embodiment of the present invention. A background projector A50 is used to project the user background to be displayed onto a pure black projection curtain A13. The background projector A50 is connected with the synchronizing unit A16. The synchronizing unit A16 coordinates the collection of the panoramic camera A7 and the projection of the background projector A50. According to the time division method, the working modes of such a system are categorized into two modes: background projection mode and camera collection mode. In the background projection mode, the background projector A50 projects the background to a black curtain A13. At this time, the panoramic camera A7 is inactive and does not collect signals. In the camera collection mode, the background projector A50 is inactive and does not project images, and the panoramic camera A7 photographs the scene. In this case, the background of the user A15 photographed by the panoramic camera A7 is a dark background. The local background seen by the user is not black, but is an image projected by the background projector A50 only if the shift is fast enough. The image is replaceable, and can be in harmony with the decoration of the conference room.

Figure 20:
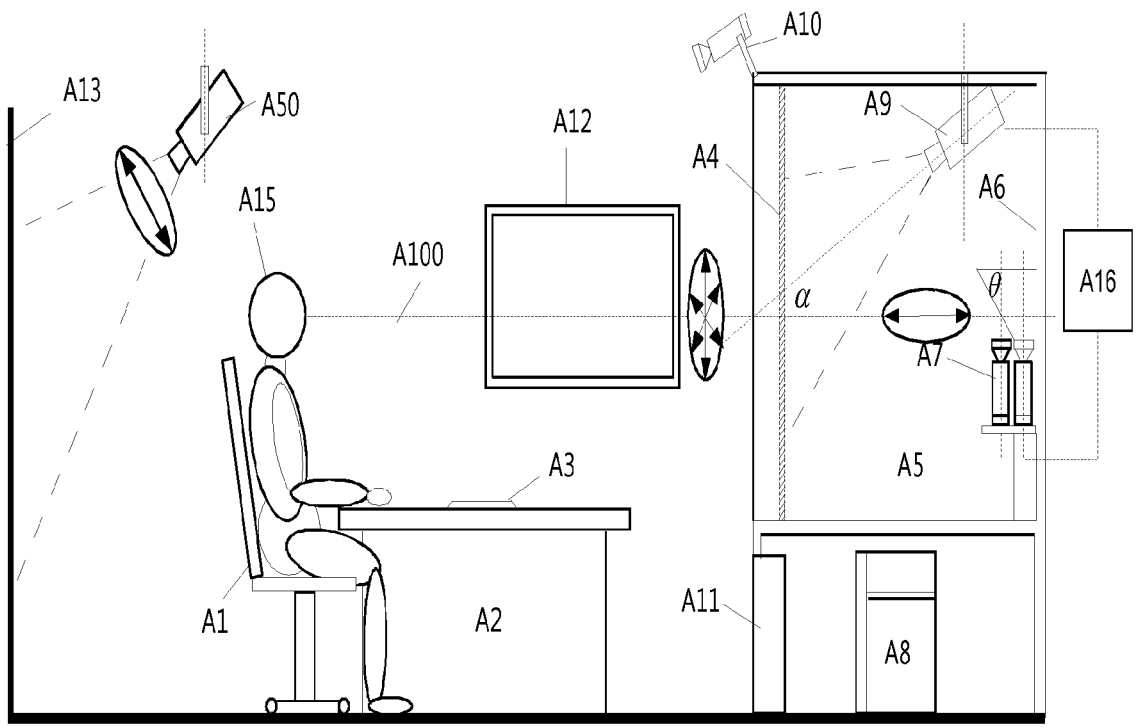
FIG. 20 is the second schematic diagram of a telepresence system in a seventh embodiment of the present invention.

FIG. 20 is the second schematic diagram of a telepresence system in the seventh embodiment of the present invention. In FIG. 20, a linear polarizer is added in front of the background projector A50 so that the light projected to the background wall is linear polarized light. Another linear polarizer is added in front of the panoramic camera A7, and the polarization angle of this polarizer is vertical to the polarization angle of the polarizer in front of the background projector A50. In this way, the background light projected by the background projector A50 is not collectible by the panoramic camera A7, and the conference room lamp light reflected by a foreground person is circularly polarized, and can be photographed by the camera A7. Therefore, the background behind the person is black in the photographed image, thus solving the dark background problem.

Figure 21:
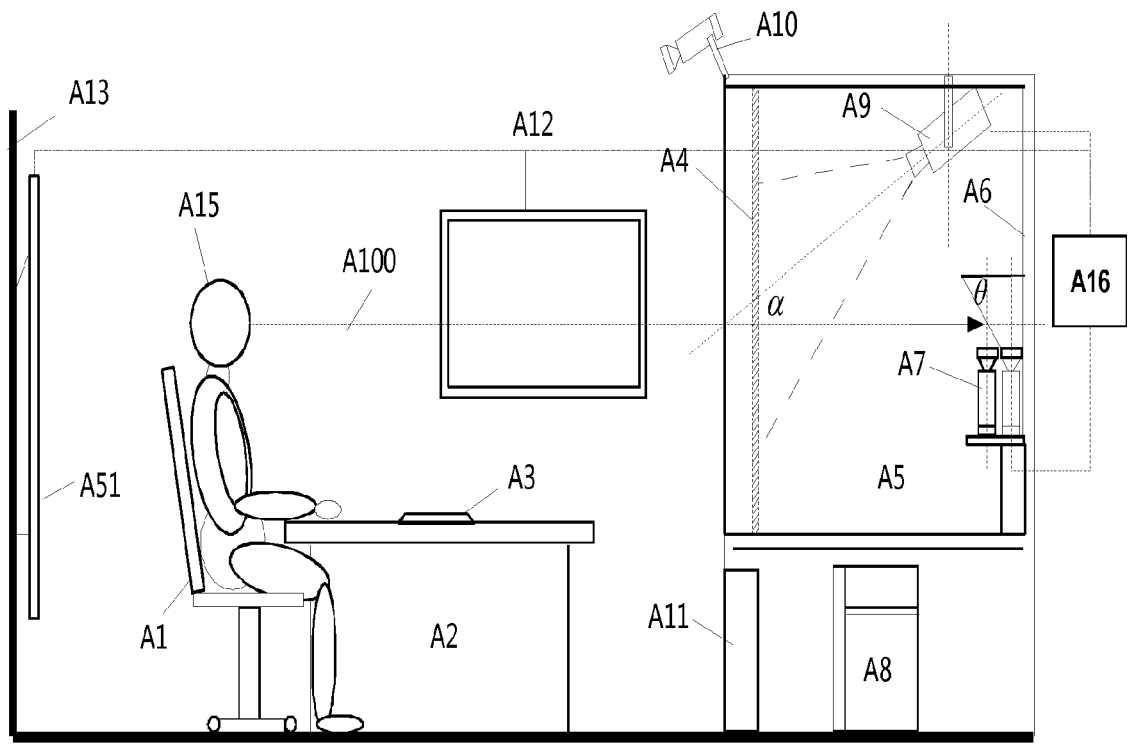
FIG. 21 is the third schematic diagram of a telepresence system in a seventh embodiment of the present invention.

FIG. 21 is the third schematic diagram of a telepresence system in the seventh embodiment of the present invention. In FIG. 21, a large-sized background monitor A51 is applied behind the user to display the background image. The background monitor A51 is connected with the synchronizing unit A16. The synchronizing unit A16 coordinates the collection of the panoramic camera A7 and the display of the background monitor A51. According to the time division method, the working modes of the system are categorized into two modes: background display mode and camera collection mode. In the background display mode, the background monitor A51 displays the normal image. At this time, the panoramic camera A7 is inactive and does not collect signals. In the camera collection mode, the background monitor A51 displays a pure black background image, and the panoramic camera A7 photographs the scene. In this case, the background of the user A15 photographed by the panoramic camera A7 is a dark background. The image seen by the user and displayed by A51 is not black only if the shift is fast enough.

Figure 22:
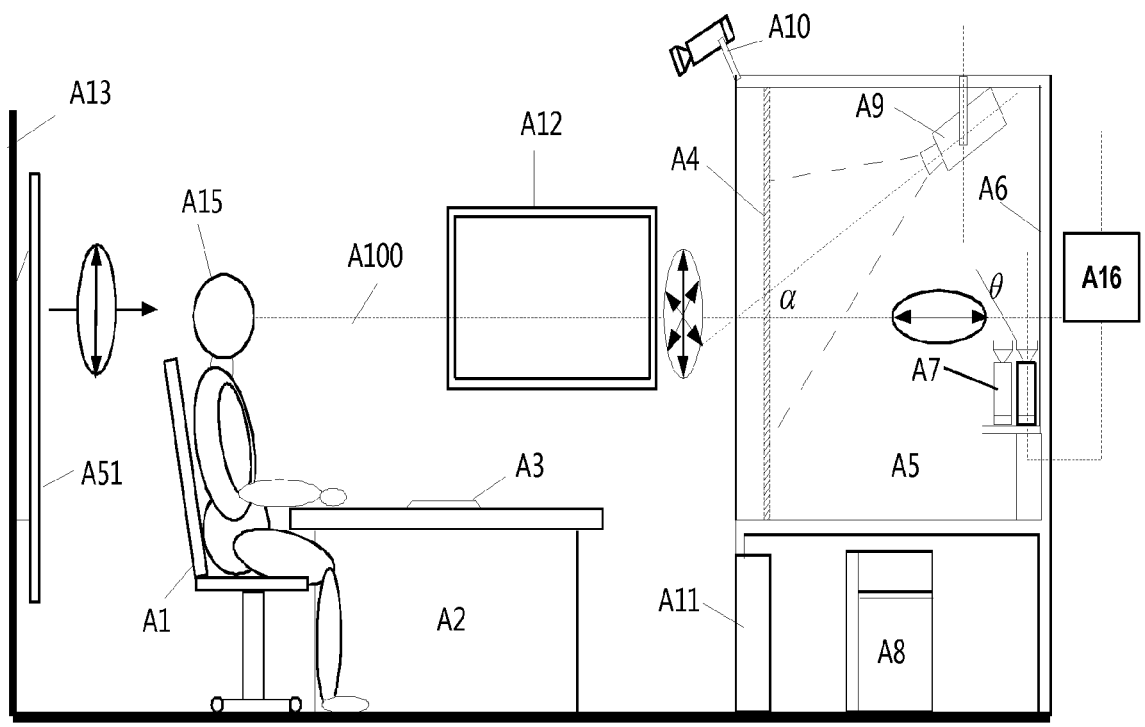
FIG. 22 is the fourth schematic diagram of a telepresence system in a seventh embodiment of the present invention.

FIG. 22 is the fourth schematic diagram of a telepresence system in the seventh embodiment of the present invention. In FIG. 22, a large background monitor A51 is placed behind the person, a linear polarizer is added in front of the background monitor A51, and another linear polarizer is added in front of the panoramic camera A7. If the background monitor A51 is an LCD monitor, the background light emitted by the LCD is polarized light. Therefore, only one linear polarizer needs to be added in front of the panoramic camera A7, and the polarization angle of the linear polarizer is vertical to the polarization angle of the background polarized light emitted by the background monitor A51. In this way, the background light of the background monitor A51 is not collectible by the panoramic camera A7, and the conference room lamp light reflected by the foreground person is circularly polarized, and can be photographed by the panoramic camera A7. Therefore, the background behind the person is black in the photographed image, thus solving the dark background problem.

It can be seen from the above description that, in the seventh embodiment, a background projector A50 or background monitor A51 projects the user background to be displayed to a black projection curtain A13, thus solving the dark background layout behind the user. The seventh embodiment may be combined with embodiments 1-6.

In conclusion, this embodiment is an upgrade from the existing telepresence system. The ordinary camera can be replaced with a panoramic camera to photograph the panorama of the local conference room and provide a conference panorama for the opposite attendee. In this way, the telepresence system gives a good panoramic presence effect, and is compatible with the existing telepresence system.

Preferably, an ordinary projection screen or holographic transparent projection screen is employed to present the panoramic images in an integrated way, thus implementing seamless presence and overcoming the defect brought by combination of multiple flat televisions.

Preferably, a holographic transparent projection screen and a semi-reflective semi-transparent mirror are employed to provide depth presence for the attendees.

Preferably, through control of a synchronizing unit, the panoramic camera is free from impact caused by the image projection of the projector when photographing the local images, thus avoiding disparity caused by inability of placing the camera in the line of sight of the user and enabling the opposite attendee to enjoy the eye contact. Besides, the semi-reflective semi-transparent mirror or an optical transmission component or a linear polarizer may be used to enable eye contact.

Preferably, a special dark background is deployed, a background projector or background monitor is used, and a dark background is deployed behind the user. In this way, the user image is separated from the background image, and the effect of depth presence is generated.

Figure 23:
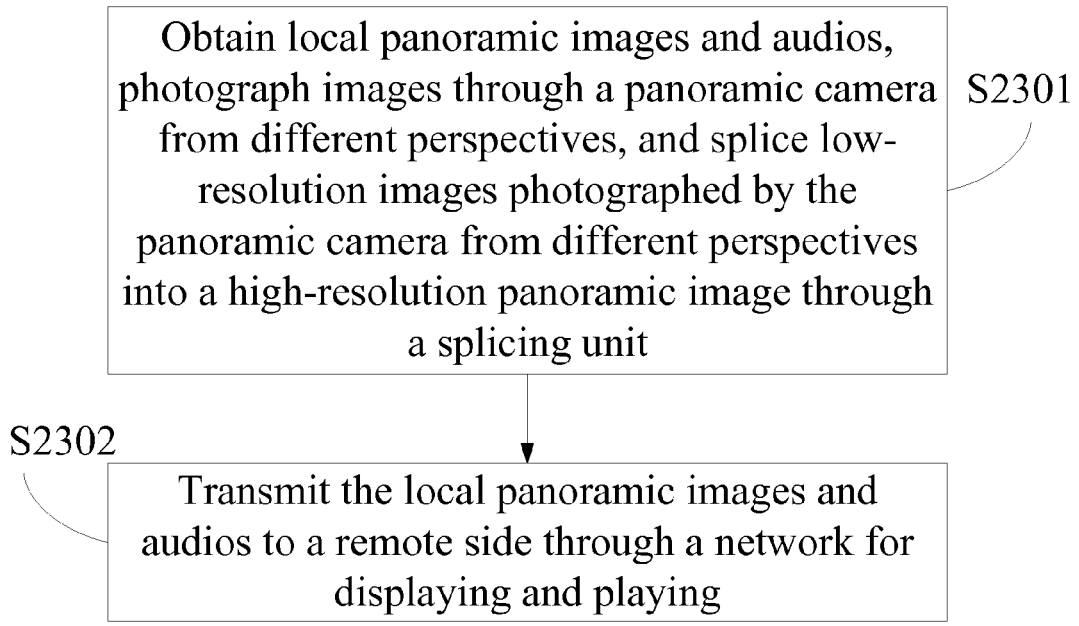
FIG. 23 is a flowchart of a telepresence method in an embodiment of the present invention.

Moreover, a remote presence method is provided in an embodiment of the present invention. As shown in FIG. 23, the method includes the following steps:

S2301: Obtain local panoramic images and audios, photograph images through a panoramic camera from different perspectives, and splice low-resolution images photographed by the panoramic camera from different perspectives into a high-resolution panoramic image through an image mosaics unit.

S2302: Transmit local panoramic images and audios to a remote end through a network for displaying and playing.

The panoramic camera photographs the scene in any of these modes: virtual common optical center of planar reflection mirrors, convergent multi-camera mode, and dense camera array mode.

Preferably, the images and audios are collected alternately in time order. Preferably, the method further includes: collecting the local 3D videos through a stereoscopic camera, transmitting the videos to the remote end through a network, and displaying the videos through an auxiliary display device. Preferably, before displaying the panoramic image, the method further includes: performing geometrical correction and edge blending for the panoramic image. Preferably, the method further includes: receiving location information of the remote attendee, and rebuilding and reproducing the sound field for the received audios according to the location information. Preferably, the method further includes: synchronizing for the locally obtained audio data and video data.

A video collection device in a telepresence system is provided in an embodiment of the present invention.

The video collection device works together with the video display device, audio collection device, audio player, and audio and video communication device in the telepresence system. The audio and video communication device transmits the images collected by the local video collection device and the audios collected by the local audio collection device to the remote end through the network. The video display device and the audio player on the remote end display and play the images and audios respectively. Compared with the prior art, the video collection device in the embodiments of the present invention is a panoramic camera, and an image mosaics unit is used to splice the low-resolution images photographed by the panoramic camera from different perspectives into a high-resolution panoramic image.

The image mosaics unit is an independent device, or a part of the panoramic camera, or a part of the audio and video communication device. The panoramic camera photographs the scene in any one of these modes: virtual common optical center of planar reflection mirrors, convergent multi-camera mode, and dense camera array mode.

Described above are merely some exemplary embodiments of the present invention, but not intended to limit the scope of the present invention. Any modification, equivalent replacement, and improvement made without departing from the spirit and principle of the present invention fall within the scope of the present invention.

What is claimed is:

1. A telepresence system, comprising:
a video collection device, configured to collect images on a local end;
an audio collection device, configured to collect audios on the local end;
a video display device, configured to display images from a remote end;
an audio player, configured to play audios from the remote end;
an audio and video communication device, configured to transmits the images collected by the video collection device on the local end and audios collected by the audio collection device on the local end to the remote end through a network, wherein the video display device comprises a projection screen and at least one projector configured to project the image of the remote end to the projection screen;
a background disposed behind the projection screen, wherein the projection screen is a semi-transparent projection screen or a transparent projection screen, so that the background is visible through the projection screen; the system further comprises a transparent optical conduction component, the transparent optical conduction component has an optical redirection area covering the projection screen; and
the video collection device is configured to photograph the images reflected by inner surface of the optical redirection area.

2. The system of claim 1, wherein the video collection device is a panoramic camera, and the system further comprises an image mosaics unit which is configured to splice narrow images photographed by the panoramic camera from different perspectives into a broad panoramic image.

3. The system of claim 2, wherein:
the transparent projection screen is a holographic transparent projection screen, and the panoramic camera is configured to capture the images transmitted via the holographic transparent projection screen.

4. The system of claim 3, wherein:
the system further comprises a synchronizing unit, configured to output synchronization signals to control the panoramic camera and the projector to work alternately.

5. The system of claim 1, wherein the inner surface of the optical redirection area adopts holographically derived grating.

6. The system of claim 2, wherein:
the video display device comprises the project screen and at least one projector, and the system further comprises a linear polarizer which is placed in front of the projector and a lens of the panoramic camera; and
a polarization angle of a polarizer of the projector is different from a polarization angle of a polarizer of the panoramic camera.

7. The system of claim 1, wherein the audio player is at least one speaker array,
the audio and video communication device is further configured to receive remote audios and remote attendee location information transmitted by the audio and video communication device on the remote end, wherein the location information is detected by the audio and video communication device on the remote end through the audio collection device on the remote end;
the speaker array is configured to select one or more speakers closest to the remote attendee displayed on the projection screen to reproduce a sound field for received audios.

8. The system of claim 1, wherein the audio collection device is at least one microphone array,
the microphone array is configured to collect audios on the local end, calculate out location information of a speaking attendee by utilizing an audio positioning algorithm, and output attendee location information to the remote end through network.

9. The system of claim 2, wherein:
the system further comprises a black backdrop and a background projector, and the background projector works alternately with the panoramic camera under control of the synchronizing unit of the system, or
the system further comprises a background monitor placed behind the attendee, and the background monitor works alternately with the panoramic camera under control of the synchronizing unit.

10. The system of claim 2, wherein:
the system further comprises a background projector, the linear polarizer is added in front of the background projector and the lens of the panoramic camera respectively, and the polarization angle of the polarizer of the background projector is different from the polarization angle of the polarizer of the panoramic camera.

11. The system of claim 2, wherein:
the system further comprises a background monitor placed behind the attendee, the linear polarizer is added in front of the background monitor and the lens of the panoramic camera respectively, and a polarization angle of a polarizer of the background monitor is different from the polarization angle of the polarizer of the panoramic camera; or
the system further comprises a Liquid Crystal Display (LCD) placed behind the attendee, the linear polarizer is added in front of the lens of the panoramic camera, and a polarization angle of light emitted by the LCD is different from the polarization angle of the polarizer of the panoramic camera.

12. The system of claim 1, wherein:
the system further comprises a stereoscopic camera and an auxiliary display device, the audio and video communication device transmits three-dimensional (3D) videos collected by the stereoscopic camera on the local end to the auxiliary display device on the remote end through the network for displaying.

13. The system of claim 1, wherein:
the system further comprises an image correcting/blending unit;
the image correcting/blending unit on the local end is configured to perform geometrical correction and edge blending for the images transmitted from the remote end; and
the images that have undergone the geometrical correction and edge blending are displayed through the video display device on the local end.

14. The system of claim 13, wherein:
the display device comprises two or more projectors, the image correcting/blending unit is further configured to split the panoramic image into images whose quantity is equal to the quantity of the projectors, and output the split and processed images to the projectors respectively for displaying.

15. The system of claim 1, wherein:
the audio and video communication device receives remote attendee location information transmitted by the audio and video communication device on the remote end, wherein the location information is detected by the audio and video communication device on the remote end through the audio collection device on the remote end; and the audio player reproduces a sound field for received audios according to the location information.

* * * * *